(12) United States Patent
Kato et al.

(10) Patent No.: US 8,189,438 B2
(45) Date of Patent: May 29, 2012

(54) CONTROL APPARATUS, CONTROL METHOD, ACCESS APPARATUS, ACCESS METHOD, PROGRAM AND WRITE-ONCE RECORDING MEDIUM

(75) Inventors: Hisae Kato, Osaka (JP); Hiroshi Ueda, Nara (JP); Motoshi Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 201 days.

(21) Appl. No.: 12/351,238

(22) Filed: Jan. 9, 2009

(65) Prior Publication Data

US 2009/0180364 A1 Jul. 16, 2009

Related U.S. Application Data

(63) Continuation of application No. 10/968,723, filed on Oct. 19, 2004, now Pat. No. 7,916,588.

(30) Foreign Application Priority Data

Oct. 20, 2003 (JP) ................................. 2003-358668
Mar. 2, 2004 (JP) ................................. 2004-058281

(51) Int. Cl.
*G11B 7/00* (2006.01)
(52) U.S. Cl. ............... 369/47.15; 369/44.11; 369/44.26; 369/44.27; 369/47.27; 369/275.1; 369/275.3
(58) Field of Classification Search ............... 369/275.3, 369/47.15, 44.11, 44.26, 44.27, 47.27, 275.1
See application file for complete search history.

(56) References Cited

U.S. PATENT DOCUMENTS

| 6,137,769 | A | * | 10/2000 | Sawada et al. | ............. 369/275.3 |
| 6,925,039 | B2 | | 8/2005 | Yanagawa et al. | |
| 6,958,965 | B2 | * | 10/2005 | Ueda et al. | ................. 369/53.21 |
| 7,630,280 | B2 | * | 12/2009 | Suh et al. | ..................... 369/47.1 |
| 7,751,300 | B2 | * | 7/2010 | Lee et al. | .................... 369/275.3 |
| 2003/0185121 | A1 | * | 10/2003 | Narumi et al. | ............. 369/47.53 |
| 2005/0117460 | A1 | * | 6/2005 | Sato et al. | ................. 369/30.03 |

FOREIGN PATENT DOCUMENTS

| JP | 06-076466 | 3/1994 |
| JP | 07-201059 | 8/1995 |
| JP | 09-231588 | 9/1997 |
| JP | 2000-195178 | 7/2000 |
| JP | 2001-184675 | 7/2001 |
| JP | 2001-184678 | 7/2001 |
| JP | 2002-170265 | 6/2002 |
| JP | 2003-173549 | 6/2003 |

OTHER PUBLICATIONS

Japanese office action for corresponding application No. 2004-304572 issued Mar. 19, 2009.

(Continued)

*Primary Examiner* — Wayne Young
*Assistant Examiner* — Linh Nguyen
(74) *Attorney, Agent, or Firm* — Renner, Otto, Boisselle & Sklar, LLP

(57) ABSTRACT

A control apparatus is provided for controlling an access means for accessing a recording medium containing at least one area so that the access means accesses the at least one area. The apparatus comprises a means for determining whether or not at least one first recorded area storing data is included in the at least one area, and a means for controlling the access means. When it is determined that the at least one first recorded area is included in the at least one area, the control means controls the access means based on a result of accessing the at least one first recorded area.

5 Claims, 17 Drawing Sheets

OTHER PUBLICATIONS

Japanese office action for corresponding application No. 2004-304572 issued Jun. 30, 2009.

Japanese Office Action for corresponding Japanese Application No. 2009-188719 issued Feb. 2, 2011.

* cited by examiner

Double layer rewritable optical disc 1000

CONTROL APPARATUS, CONTROL METHOD, ACCESS APPARATUS, ACCESS METHOD, PROGRAM AND WRITE-ONCE RECORDING MEDIUM

This application is a continuation application of U.S. patent application Ser. No. 10/968,723 filed on Oct. 19, 2004 now U.S. Pat No. 7,916,558, claims priority under 35 U.S.C. §119 (a) on Patent Application No. 2003-358668 filed in Japan on Oct. 20, 2003 and Patent Application No. 2004-058281 filed in Japan on Mar. 2, 2004, the entire contents of which are hereby incorporated by reference.

BACKGROUND OF THE INVENTION

1. Field of the Invention

The present invention relates to an apparatus and method for controlling an access means for accessing a recording medium containing at least one area so that the access means accesses at least one area. The present invention also relates to an access apparatus comprising an access means for accessing a recording medium containing at least one area and a control means for controlling the access means. The present invention also relates to an access method, a program, and a write-once recording medium containing a plurality of areas.

2. Description of the Related Art

Optical discs are information recording media having a sector structure. Recently, AV data such as audio and video data has been digitized, and therefore, there is a demand for higher density and larger capacity optical discs.

As an optical disc which realizes large capacity, BD (Blu-ray Disc) has been being developed. A type of BD is a single layer disc capable of holding up to 25 gigabytes (GB) of data, which is 5 times or more larger than that of DVD. The recording speed is also increased to about three times higher than that of DVD. Recording/reproduction of a high-density disc, such as a BD, requires high-precision servo control or signal processing. To achieve this, functions for adjusting various reproduction control parameters are required when starting up a disc after the disc is loaded.

A reproduction control parameter is, for example, a focus position at which a light spot converges on an optical disc. The focus position is adjusted by, for example, a method for minimizing jitter which indicates the quality of a reproduction signal (Japanese Laid-Open Publication No. 10-149550).

Hereinafter, apparatus startup and focus position adjustment will be described.

FIG. 16 shows an exemplary startup procedure for a conventional apparatus. Hereinafter, a startup procedure for a conventional apparatus will be described step by step with reference to FIG. 16.

Step S1201: a laser of a reproduction apparatus emits light. An optical disc is irradiated with a light beam having a reproduction power.

Step S1202: a disc motor is activated. The optical disc is rotated with a predetermined speed.

Step S1203: a control (focusing control) is started so as to control an objective lens for controlling a laser beam to focus on the optical disc.

Step S1204: a control (tracking control) is started so as to move and cause the focus position to follow a spiral track.

Step S1205: a reproduction pickup is shifted to a prerecorded area previously determined on the optical disc.

Step S1206: the focus over the optical disc is moved little by little from the optical pickup toward the optical disc, while measuring jitter recorded in the prerecorded area. In other words, in step S1206, a focus position which provides the most satisfactory reproduction quality is determined while repeating reproduction of the prerecorded area.

As used herein, jitter is an indicator for indicating the quality of a reproduction signal. Jitter indicates a deviation of a reproduction signal in a time-axis direction.

Step S1207: as in Step S1206, jitter of the prerecorded area is measured while tilting the lens of the pickup little by little. In Step S1207, the tilt of the lens is set to a value which minimizes a jitter value (i.e., satisfactory signal quality).

As described above, the apparatus is adjusted by, for example, measuring jitter in the prerecorded area so that the reproduction signal quality becomes most satisfactory.

FIG. 17 is a diagram for explaining an exemplary focus position adjusting method. The horizontal axis indicates a focus offset (focus position) to be set, where the focus position is shifted farther from the lens as the offset value is increased. The vertical axis indicates a jitter value.

In general, a relationship between a focus position and jitter is such that a jitter value is minimized at the best focus position, and is increased when the focus is deviated from the best focus position (see FIG. 17).

The exemplary focus position adjusting method is performed as follows. A jitter value is measured while a focus offset value is increased little by little from a small value. A focus offset is determined when the jitter value is minimized. The focus offset value is set to a and a jitter value is measured in the prerecorded area to obtain a jitter value J(a). Similarly, the focus offset value is set to b, c or d, and thereafter, a jitter value J(b), J(c) or J(d) is respectively measured. In the method, the smallest jitter value is obtained when the focus offset value is c. Thus, the focus offset value is set to c.

As described above, measurement of an indicator (e.g., jitter, etc.) is essential for accurate adjustment of a reproduction control parameter, such as a focus position or the like. Therefore, the presence of a recorded area, in which an indicator can be measured, is essentially required for learning.

Conventionally, reproduction-only discs are shipped after data has been recorded thereinto. Therefore, it is easy to detect a recorded area. Also, in DVD-RAM (Digital Versatile Disc Random Access Memory) and DVD-RW (Digital Versatile Disc Rewritable), a control information area which is necessarily recorded before shipment is included in a lead-in area at an inner peripheral portion of the disc, and the control information area is used to adjust a reproduction control parameter.

However, in some types of rewritable or write-once optical discs (e.g., BD), control information is recorded in the form of wobble of a track at an inner peripheral portion of the optical disc (wobble recording method). Therefore, such optical discs do not necessarily have a recorded area which can be used to measure a reproduction quality indicator (e.g., jitter, etc.). As a result, it is difficult to perform adjustment based on a reproduction quality indicator for an optical disc which has no recorded area.

Further, in order to achieve a high-speed startup using a recorded area, it is necessary to efficiently determine whether or not an optical disc has a recorded area.

Further, in order to efficiently determine whether or not an optical disc has a recorded area while various reproduction control parameters are not sufficiently adjusted, reliability is required for determination of whether data is recorded or unrecorded in an area.

Further, in multi-layer recording media having a plurality of recording layers, reproduction control parameters need to be adjusted appropriately for the recording layers having different characteristics.

Further, a recorded area needs to be searched for efficiently in each of a rewritable optical disc and a write-once optical disc which have different sequences of recorded data.

Further, when a search for a recorded area is not performed in an optical disc which has no recorded area, it is determined that an optical disc has no recorded area in the next reproduction control parameter adjustment.

Further, in write-once optical discs, data can be written only once. Therefore, a limited area needs to be used effectively.

SUMMARY OF THE INVENTION

According to an aspect of the present invention, a control apparatus is provided for controlling an access means for accessing a recording medium containing at least one area so that the access means accesses the at least one area. The apparatus comprises a means for determining whether or not at least one first recorded area storing data is included in the at least one area, and a means for controlling the access means. When it is determined that the at least one first recorded area is included in the at least one area, the control means controls the access means based on a result of accessing the at least one first recorded area.

In one embodiment of this invention, when it is determined that the at least one first recorded area is not included in the at least one area. The access means is controlled so that the access means records data into at least one of the at least one area. The access means is controlled so that the access means accesses at least one second recorded area in which data has been recorded by the access means. The access means is controlled based on a result of accessing the at least one second recorded area.

In one embodiment of this invention, the access means is controlled in response to a request for physical formatting.

In one embodiment of this invention, the at least one first recorded area includes an area in which data has been recorded in response to a request for physical formatting.

In one embodiment of this invention, the at least one first recorded area includes at least one defect management area storing defect management information for managing a defective area on the recording medium.

In one embodiment of this invention, the at least one first recorded area includes at least one control data area storing control information.

In one embodiment of this invention, the access means is controlled so that data is reproduced from the at least one area. It is determined whether or not the data has been normally reproduced. Based on the result of the determination, it is determined whether or not the at least one first recorded area is included in the at least one area.

In one embodiment of this invention, the access means is controlled so that the access means irradiates the at least one area with light and detects the light reflected from the at least one area. Based on the amount of detected light, it is determined whether or not the at least one first recorded area is included in the at least one area.

In one embodiment of this invention, based on a state of acquisition of subcode information containing address information and user data, it is determined whether or not the at least one first recorded area is included in the at least one area.

In one embodiment of this invention, when it is not determined that the at least one first recorded area is not included in the at least one area. The access means is controlled so that the access means records data into at least one of the at least one area based on access means control data for controlling the access means, which has been previously recorded in the recording medium. The access means is controlled so that the access means accesses at least one third recorded area in which the data has been recorded, based on the access means control data. Based on a result of accessing the at least one third recorded area, the access means is controlled.

In one embodiment of this invention, the access means is constructed to be able to access a non-volatile memory storing access means control data for controlling the access means. When it is determined that the at least one first recorded area is not included in the at least one area. The control apparatus controls the access means so that the access means accesses the non-volatile memory, and controls the access means based on the access means control data.

In one embodiment of this invention, when it is determined that the at least one first recorded area is not included in the at least one area. The access means is controlled so that the access means records data into at least one of the at least one area while changing access means control data for controlling the access means. The access means is controlled so that the access means accesses at least one third recorded area in which the data has been recorded, based on desired access means control data of the access means control data. Based on a result of accessing the at least one third recorded area, the access means is controlled.

In one embodiment of this invention, when it is determined that the at least one first recorded area is not included in the at least one area. The access means is controlled so that the access means accesses at least one unrecorded area of the at least one area. Based on a result of accessing the at least one unrecorded area, the access means is controlled.

According to another aspect of the present invention, a control method is provided for controlling an access means for accessing a recording medium containing at least one area so that the access means accesses the at least one area. The method comprises determining whether or not at least one first recorded area storing data is included in the at least one area, and controlling the access means. When it is determined that the at least one first recorded area is included in the at least one area, the access means is controlled based on a result of accessing the at least one first recorded area.

In one embodiment of this invention, the control method comprises, when it is determined that the at least one first recorded area is not included in the at least one area, controlling the access means so that the access means records data into at least one of the at least one area, controlling the access means so that the access means accesses at least one second recorded area in which data has been recorded by the access means, and controlling the access means based on a result of accessing the at least one second recorded area.

In one embodiment of this invention, the control method comprises controlling the access means in response to a request for physical formatting.

In one embodiment of this invention, the at least one first recorded area includes an area in which data has been recorded in response to a request for physical formatting.

In one embodiment of this invention, the at least one first recorded area includes at least one defect management area storing defect management information for managing a defective area on the recording medium.

In one embodiment of this invention, the at least one first recorded area includes at least one control data area storing control information.

In one embodiment of this invention, the control method comprises controlling the access means so that data is reproduced from the at least one area, determining whether or not the data has been normally reproduced, and based on the result of the determining step, determining whether or not the at least one first recorded area is included in the at least one area.

In one embodiment of this invention, the control method comprises controlling the access means so that the access means irradiates the at least one area with light and detects light reflected from the at least one area, and based on an amount of the detected light, determining whether or not the at least one first recorded area is included in the at least one area.

In one embodiment of this invention, the control method comprises determining whether or not the at least one first recorded area is included in the at least one area, based on a state of acquisition of subcode information containing address information and user data.

In one embodiment of this invention, the control method comprises, when it is not determined that the at least one first recorded area is not included in the at least one area, controlling the access means so that the access means records data into at least one of the at least one area based on access means control data for controlling the access means, which has been previously recorded in the recording medium, controlling the access means so that the access means accesses at least one third recorded area in which the data has been recorded, based on the access means control data, and based on a result of accessing the at least one third recorded area, controlling the access means.

In one embodiment of this invention, the access means is constructed to be able to access a non-volatile memory storing access means control data for controlling the access means. The method comprises, when it is determined that the at least one first recorded area is not included in the at least one area, controlling the access means so that the access means accesses the non-volatile memory, and controlling the access means based on the access means control data.

In one embodiment of this invention, the control method comprises, when it is determined that the at least one first recorded area is not included in the at least one area, controlling the access means so that the access means records data into at least one of the at least one area while changing the access means control data for controlling the access means, controlling the access means so that the access means accesses at least one third recorded area in which the data has been recorded, based on the desired access means control data of the access means control data, and based on a result of accessing the at least one third recorded area, controlling the access means.

In one embodiment of this invention, the control method comprises, when it is determined that the at least one first recorded area is not included in the at least one area, controlling the access means so that the access means accesses at least one unrecorded area of the at least one area, and based on a result of accessing the at least one unrecorded area, controlling the access means.

According to another aspect of the present invention, a program is provided for executing a control process for controlling an access means for accessing a recording medium containing at least one area so that the access means accesses the at least one area. The control process comprises determining whether or not at least one first recorded area storing data is included in the at least one area, and controlling the access means. When it is determined that the at least one first recorded area is included in the at least one area, the access means is controlled based on a result of accessing the at least one first recorded area.

According to another aspect of the present invention, an access apparatus is provided, which comprises an access means for accessing a recording medium containing at least one area, and a control means for controlling the access means so that the access means accesses the at least one area. The control means determines whether or not at least one first recorded area is included in the at least one area. When the control means determines that the at least one first recorded area is included in the at least one area, the control means controls the access means based on a result of accessing the at least one first recorded area.

According to another aspect of the present invention, an access method of using an access means for accessing a recording medium containing at least one area to access the at least one area, is provided. The method comprises determining whether or not at least one first recorded area storing data is included in the at least one area, and controlling the access means. When it is determined that the at least one first recorded area is included in the at least one area, the access means is controlled based on a result of accessing the at least one first recorded area.

According to another aspect of the present invention, a program is provided for causing an access means for accessing a recording medium containing at least one area to execute an access process of accessing the at least one area. The access process comprises determining whether or not at least one first recorded area storing data is included in the at least one area, and controlling the access means. When it is determined that the at least one first recorded area is included in the at least one area, the access means is controlled based on a result of accessing the at least one first recorded area.

According to another aspect of the present invention, a write-once recording medium is provided, which comprises a plurality of areas. The plurality of areas include at least one user data area for storing user data and at least one control data area for storing control information. When at least one area of the at least one user data area is a recorded area, the at least one control data area is at least one recorded area.

According to another aspect of the present invention, a write-once recording medium is provided, which comprises a plurality of areas. The plurality of areas include at least one user data area for storing user data and at least one control data area for storing control information. The at least one control data area is changed to at least one recorded area in response to a request for physical formatting.

According to the present invention, it is determined whether or not there is a recorded area in a recording medium. When it is determined that a recorded area is present, an access means is controlled based on a result of accessing the recorded area. Thus, in the present invention, when a recorded area is already present in a recording medium, an access means is controlled based on a result of accessing the recorded area without recording new data onto the recording medium. Therefore, a recording medium can be started up with high speed.

According to the present invention, a recorded area can be efficiently searched for by searching areas having a high possibility of being a recorded area (a defect management area or a control data area). Therefore, it is possible to reduce a time required for startup after an optical disc is mounted.

According to the present invention, in order to determine whether or not an optical disc has a recorded area, subcode information containing a strong error correction code is utilized. Therefore, it is possible to improve the reliability of determining whether or not an optical disc has a recorded area even when various access control parameters are not sufficiently adjusted.

According to the present invention, the presence or absence of a recorded area is determined based on whether or not data can be normally read out. Therefore, the determination can be achieved without incorporating an additional function into an apparatus.

According to the present invention, the presence or absence of a recorded area is determined based on the amount of reflected light due to light beam irradiation. Therefore, it is possible to more accurately determine whether or not an area is a recorded area or an unrecorded area.

According to the present invention, the number of repetitions of recording a limited OPC area can be reduced in an optical disc which previously has a recorded area, since no unrecorded area is changed to an area for access adjustment. Therefore, degradation and wear of an area for access adjustment can be prevented. As a result, the reliability and life of an optical disc can be improved.

According to the present invention, when an optical disc has no recorded area, an unrecorded area is changed to an area for access adjustment by recording data into the unrecorded area based on an access control parameter. Therefore, adjustment can be performed based on a reproduction quality indicator, thereby making it possible to provide a higher level of reproduction quality.

According to the present invention, a value set on an optical disc is used as an access control parameter for changing an unrecorded area into a recorded area for access adjustment. Therefore, reproduction adjustment can be performed quickly and reliably.

According to the present invention, a result of a previous adjustment is used as an access control parameter. Therefore, reproduction adjustment can be performed quickly and reliably.

According to the present invention, more reliable access adjustment can be achieved by adjusting an access control parameter.

According to the present invention, recorded area search and access adjustment are performed for a plurality of recording layers having different characteristics of a multi-layer recording medium, separately. Therefore, access adjustment can be appropriately performed for each recording layer.

According to the present invention, an area which it is determined whether or not to be a recorded area is used as a recorded area. Therefore, such an area can be utilized in the next startup process.

According to the present invention, for each of a rewritable optical disc and a write-once optical disc having partially different recording orders, recorded area searches can be efficiently performed depending on the recording method for each optical disc type.

According to the present invention, recorded area searches can be performed in substantially the same manner between a rewritable optical disc and a write-once optical disc.

According to the present invention, an area which is recorded in a physical formatting process can be utilized in the next startup process for a rewritable optical disc and a write-once optical disc.

According to the write-once recording medium of the present invention, when at least one recorded area is present in a data area, a control data area is used as a recorded area. Therefore, the control data area can be utilized in the next startup process.

According to the write-once recording medium of the present invention, a control data area is changed to a recorded area when an instruction for physical formatting process is received. Therefore, a usable recorded area can be created.

Thus, the invention described herein makes possible the advantages of providing: (1) an access apparatus having high reproduction quality, which performs adjustment based on a reproduction quality indicator for an optical disc which has no recorded area; (2) an access apparatus capable of efficiently determining whether or not an optical disc has a recorded area, in order to achieve high-speed startup using a recorded area; (3) an access apparatus, in which the reliability of determining whether data is recorded or unrecorded in an optical disc can be improved in order to determine whether or not an optical disc has a recorded area when various reproduction control parameters are not sufficiently adjusted partway through a startup process; (4) an access apparatus for changing an unrecorded area to a recorded area in order to use such an area for the next startup; (5) an access apparatus, which performs a recorded area search process and a learning process for each of a plurality of recording layers having different characteristics in a multi-layer recording medium; (6) an access apparatus capable of efficiently searching a rewritable optical disc and a write-once optical disc, which have different recording sequences, for a recorded area; (7) an access apparatus capable of searching a rewritable optical disc and a write-once optical disc in similar manners; and (8) an access apparatus which uses an area, which is recorded upon a physical formatting process, for the next startup of a rewritable optical disc and a write-once optical disc.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

1. Embodiment 1

1-1. Rewritable Optical Disc

Figure 1:
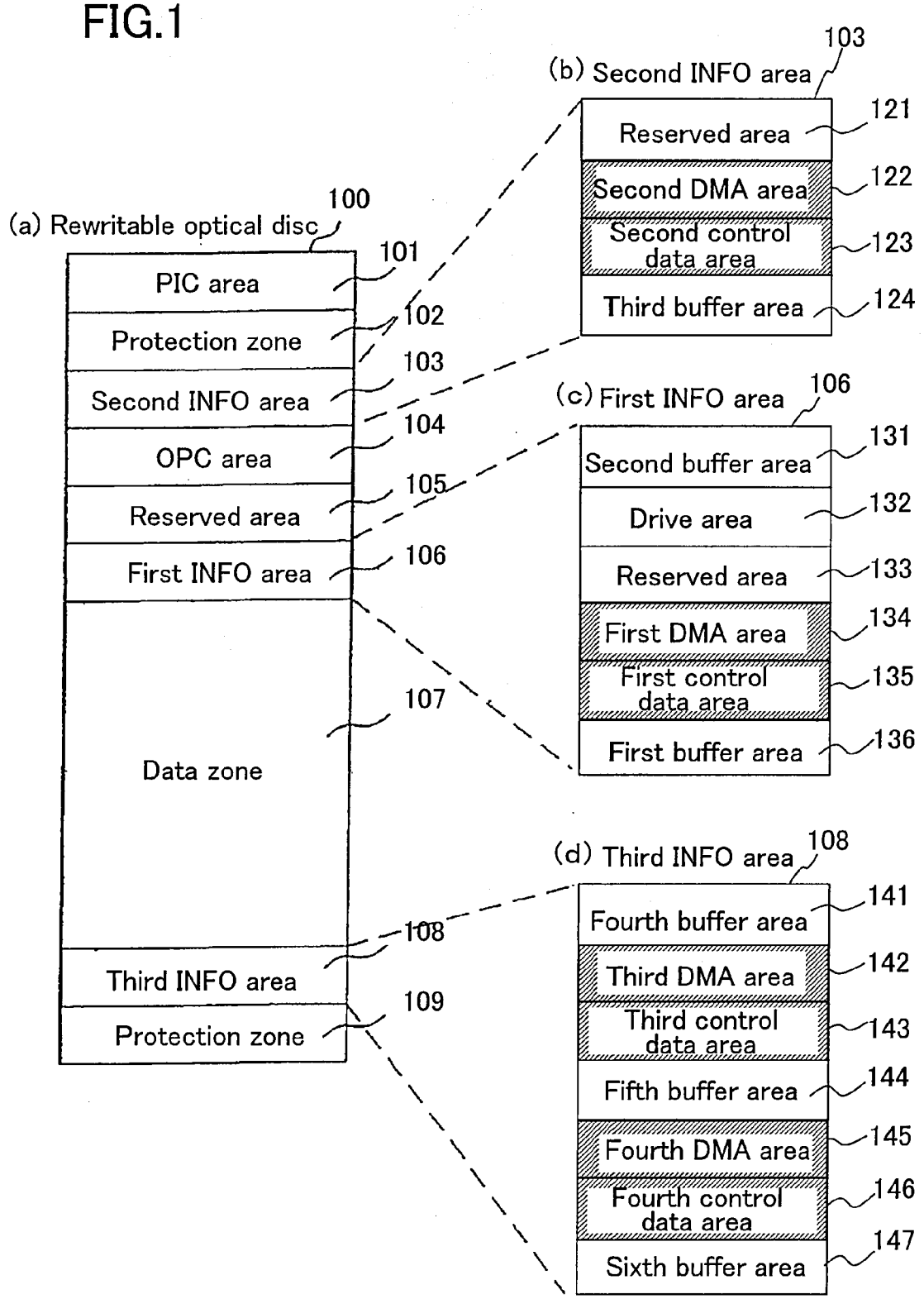
FIG. 1 is a diagram for explaining a structure of a rewritable optical disc.

FIG. 1 is a diagram for explaining a structure of a rewritable optical disc 100. The rewritable optical disc 100 may be, for example, a BD-RE (Blu-ray Disc Rewritable Format) optical disc.

Portion (a) of FIG. 1 shows a data structure of the rewritable optical disc 100.

The rewritable optical disc 100 contains a PIC (Permanent Information and Control data) area 101, a data zone 107, a protection zone 102, a protection zone 109, a first INFO area 106, a second INFO area 103, a third INFO area 108, an OPC (Optimum Power Calibration) area 104, and a reserved area 105.

For example, a largest address of the data zone 107 and a recording pulse control parameter are recorded in the PIC area 101. The recording pulse control parameters include, for example, information about a laser power for forming/erasing a mark onto/from an optical disc, and information about a recording pulse width for recording a correct mark. In the PIC area 101, information is recorded in the form of wobble of a track, and therefore, such a data recording method is different from ordinary data recording methods which form a mark on a recording film of a track. Therefore, a reproduction signal quality indicator, such as jitter or the like, cannot be measured in the PIC area 101.

The data zone 107 is an area in which user data is recorded. In the data zone 107, drive test recording information and control information are not recorded.

The protection zone 102 and the protection zone 109 are used to prevent overrun of a pickup. The protection zone 102 and the protection zone 109 are located at both ends of a recordable area on the rewritable optical disc 100. The protection zone 102 and the protection zone 109 are not used to record/reproduce data.

The first INFO area 106, the second INFO area 103 and the third INFO area 108 store defect management information and control information.

The OPC area 104 is an area, in which a recording apparatus for recording data onto the rewritable optical disc 100 adjusts a recording laser power, a pulse width, and the like as well as various apparatus control parameters.

The reserved area 105 is used for expansion in the future. The reserved area 105 is not used for recording/reproduction of data.

Portion (b) of FIG. 1 shows a data structure of the second INFO area 103.

The second INFO area 103 contains a reserved area 121 allocated for expansion in the future, a second DMA (Defect Management Area) area 122 for storing a list indicating positional information between a defective area and a replacement area for the defective area, a second control data area 123 for recording control information, and a third buffer area 124 for preventing interference from an adjacent area.

The second DMA area 122 stores a logical address designated by a higher-level control means, which is used to access the data zone 107, and information required for mapping a logical address to a physical address indicating an actual physical position. Information is recorded into the second DMA area 122 by a physical formatting process performed before use of the rewritable optical disc 100. Therefore, the second DMA area 122 is an unrecorded area when shipped, and data is initially recorded into the second DMA area 122 when user's start their use.

The second control data area 123 stores control information or NULL data containing only 0. Information is recorded into the second control data area 123 by a physical formatting process which is performed before use of the rewritable optical disc 100.

The reserved area 121 and the third buffer area 124 are not used for recording/reproduction of data. Therefore, the reserved area 121 and the third buffer area 124 are unrecorded areas.

Portion (c) of FIG. 1 shows a data structure of the first INFO area 106.

The first INFO area 106 contains a second buffer area 131 and a first buffer area 136 for preventing interference from an adjacent area, a drive area 132 for storing drive-specific control information (e.g., drive-specific adjustment information, such as an optimum recording power, a pulse width or the like), a reserved area 133 allocated for expansion in the future, a first DMA area 134 for storing a list indicating positional information between a defective area and a replacement area for the defective area, and a first control data area 135 for recording control information.

Similar to the second INFO area 103, the first DMA area 134 and the first control data area 135 are recorded when physical formatting is performed. The second buffer area 131, the reserved area 133 and the first buffer area 136 are not used for recording/reproduction of data. Therefore, these areas are unrecorded areas. It is a matter of implementation of the apparatus whether or not the drive area 132 is used. In the case of a disc on which recording is performed by an apparatus which does not use the drive area 132, the drive area 132 is an unrecorded area.

Portion (d) of FIG. 1 shows a data structure of the third INFO area 108.

The third INFO area 108 contains: a fourth buffer area 141, a fifth buffer area 144 and a sixth buffer area 147 for preventing interference from an adjacent area; a third DMA area 142 and a fourth DMA area 145 for storing a list indicating positional information between a defective area and a replacement area for the defective area; and a third control data area 143 and the fourth control data area 146 for storing control information.

Similar to the second INFO area 103, the third DMA area 142, the fourth DMA area 145, the third control data area 143 and the fourth control data area 146 are recorded when physical formatting is performed. The fourth buffer area 141, the fifth buffer area 144 and the sixth buffer area 147 are not used for recording/reproduction of data. Therefore, these areas are unrecorded areas.

As described with reference to FIG. 1, it is possible that all areas of the rewritable optical disc 100 are unrecorded areas when shipped. However, the first DMA area 134, the second DMA area 122, the third DMA area 142, the fourth DMA area 145, the first control data area 135, the second control data area 123, the third control data area 143, and the fourth control data area 146 are areas, into which data is recorded when the user starts using a disc and in which data has been recorded with high possibility (hatched portions in FIG. 1).

1-2. Recording/Reproduction Apparatus

Figure 2:
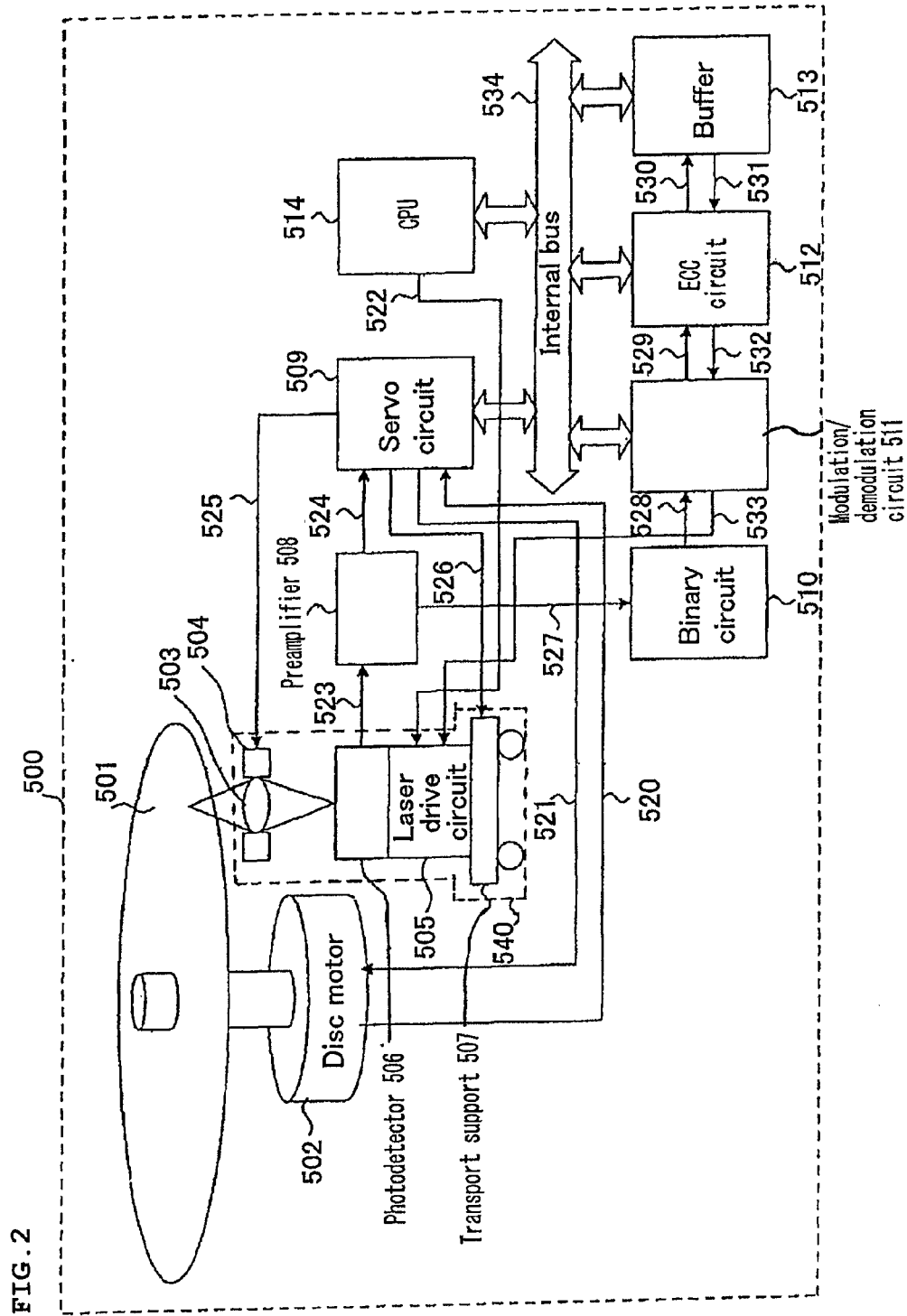
FIG. 2 is a diagram showing a configuration of a recording/reproduction apparatus according to Embodiment 1 of the present invention.

FIG. 2 shows a configuration of a recording/reproduction apparatus 500 according to Embodiment 1 of the present invention.

The recording/reproduction apparatus 500 is constructed so that an optical disc can be inserted thereinto. The optical disc is, for example, the rewritable optical disc 100.

The recording/reproduction apparatus 500 comprises a disc motor 502, an optical head apparatus 540, a preamplifier 508, a servo circuit 509, a binary circuit 510, a modulation/demodulation circuit 511, an ECC circuit 512, a buffer 513, a CPU 514, and an internal bus 534.

The optical head apparatus 540 comprises a lens 503, an actuator 504, a laser drive circuit 505, a photodetector 506, and a transport support 507. The optical head apparatus 540 is an access means for accessing an optical disc.

These components generate a rotation detection signal 520, a disc motor drive signal 521, a laser light emission enable signal 522, a light detection signal 523, a servo error signal 524, an actuator drive signal 525, a transport support drive signal 526, an analog data signal 527, a binary data signal 528, a demodulated data signal 529, a corrected data signal 530, a stored data signal 531, a encoded data signal 532, and a modulated data signal 533.

The CPU 514 further comprises a memory. The memory stores a control program. The CPU 514 controls the whole operation of the information recording/reproduction apparatus 500 via the internal bus 534 in accordance with the control program.

The CPU 514 controls the optical head apparatus 540 so that the optical head apparatus 540 accesses an optical disc. For example, the CPU 514 outputs the laser light emission enable signal 522 and controls the optical head apparatus 540 so that the laser drive circuit 505 irradiates an optical disc 501 with laser light.

The photodetector 506 detects light reflected from the optical disc 501 and generates the light detection signal 523. The preamplifier 508 generates the servo error signal 524 and the analog data signal 527 based on the light detection signal 523.

The binary circuit 510 subjects the analog data signal 527 to A/D (analog/digital) conversion to generate the binary data signal 528. The modulation/demodulation circuit 511 demodulates the binary data signal 528 and generates the demodulated data signal 529.

The ECC circuit 512 outputs the corrected data signal 530, which has been subjected to error correction based on the demodulated data signal 529. The corrected data signal 530 is stored in the buffer 513.

The servo circuit 509 generates the actuator drive signal 525 based on the servo error signal 524. The actuator drive signal 525 is fed back to the actuator 504 which in turn uses focusing control and tracking control of the lens 503.

The stored data signal 531 is output from the buffer 513. The ECC circuit 512 adds an error correction code to the stored data signal 531, thereby generating the encoded data signal 532.

The modulation/demodulation circuit 511 modulates the encoded data signal 532 to generate the modulated data signal 533. The laser drive circuit 505 subjects laser light to power modulation with reference to the modulated data signal 533.

When the recording/reproduction apparatus 500 is used as a computer peripheral apparatus (e.g., a CD-ROM drive), for example, the recording/reproduction apparatus 500 further comprises a host interface circuit (not shown). In the recording/reproduction apparatus 500, data is transmitted/received between a host computer (not shown) and the buffer 513 via a host interface bus (not shown), such as an SCSI bus or the like.

The recording/reproduction apparatus 500 is used as a consumer apparatus (e.g., a CD player), for example, the recording/reproduction apparatus 500 further comprises an AV decoder/encoder circuit (not shown) which decompresses or compresses moving images or audio data. In the recording/reproduction apparatus 500, data is transmitted/received between the AV decoder/encoder circuit and the buffer 513.

1-3. Startup Procedure 1 for a Rewritable Optical Disc

Figure 3:
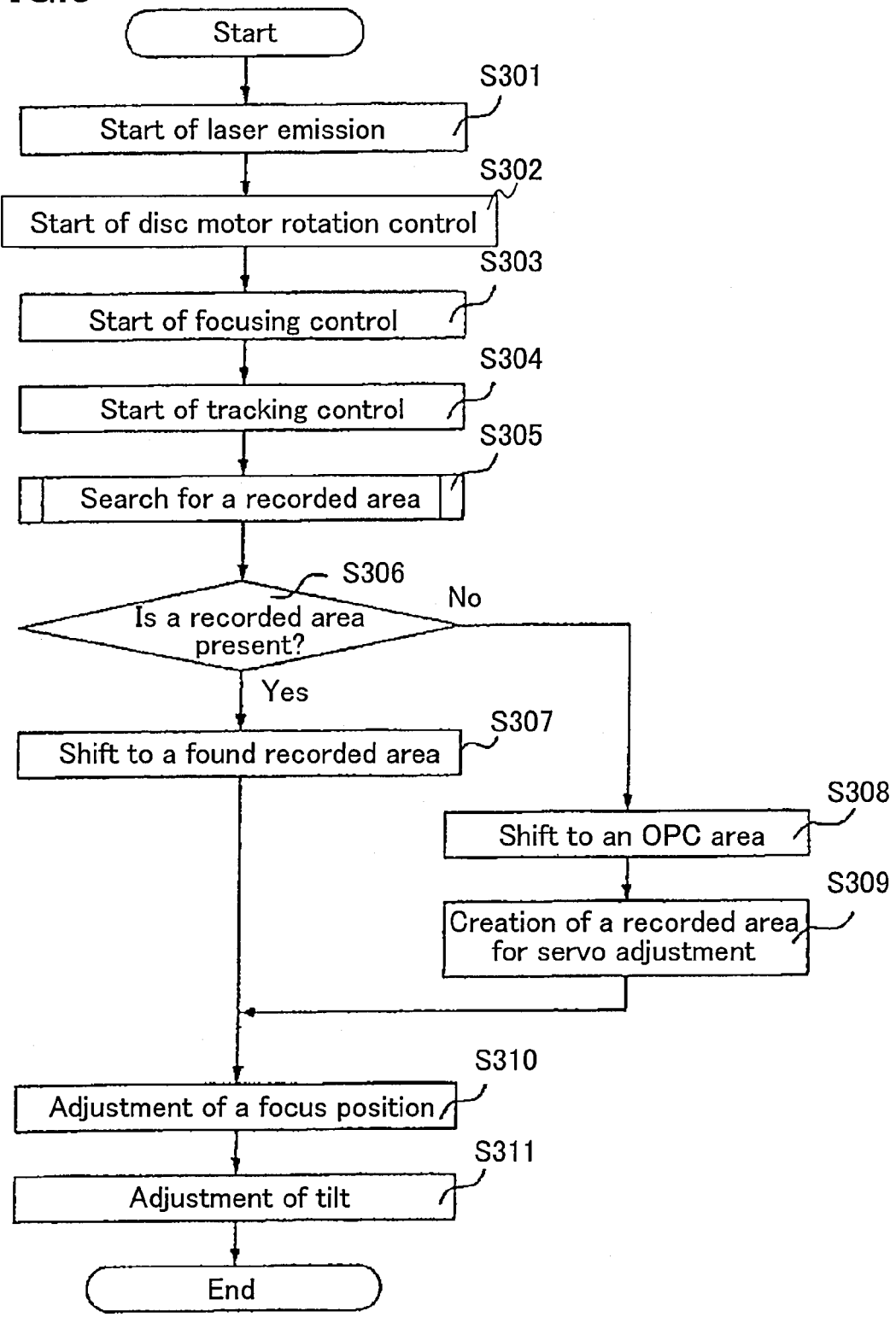
FIG. 3 is a flowchart showing a startup procedure, in which the recording/reproduction apparatus of FIG. 2 starts up an optical disc.

FIG. 3 shows a startup procedure 1, in which the recording/reproduction apparatus 500 starts up the optical disc 501.

Hereinafter, the startup procedure 1 according to Embodiment 1 of the present invention will be described step by step with reference to FIGS. 1 to 3. For example, the optical disc 501 is the rewritable optical disc 100. The startup procedure 1 of Embodiment 1 of the present invention is performed by, for example, the CPU 514.

Step S301: if the CPU 514 detects when the optical disc 501 is mounted, the CPU 514 outputs the laser light emission enable signal 522, which permits the laser drive circuit 505 to emit laser light. The laser drive circuit 505 emits laser light with a predetermined reproduction power.

Step S302: the CPU 514 instructs the servo circuit 509 to drive the disc motor 502. The servo circuit 509 controls the disc motor drive signal 521 to drive the disc motor 502 with a predetermined speed.

Step S303: the CPU 514 instructs the servo circuit 509 to start focusing control. The servo circuit 509 controls the actuator 504 based on the actuator drive signal 525 to move the lens 503 upward and downward so that the focus of the laser is brought onto the optical disc 501. In this case, the servo circuit 509 generates focus error information based on the servo error signal 524 and performs feedback control to eliminate focus error.

Step S304: the CPU 514 instructs the servo circuit 509 to start tracking control. The servo circuit 509 controls the actuator 504 via the actuator drive signal 525 to move the lens 503 so that the focus of the laser follows a track on the optical disc 501. In this case, the servo circuit 509 generates tracking error information based on the servo error signal 524 and performs feedback control to eliminate tracking error.

Step S305: a recorded area search procedure is performed. For example, the CPU 514 controls the servo circuit 509 so that the optical head apparatus 540 is moved to a predetermined position on the optical disc 501, and performs a search for a recorded area.

The details of the recorded area search procedure (step S305) will be described elsewhere below.

Step S306: the CPU 514 determines whether or not a recorded area is included in at least one area of the optical disc 501.

When it is determined that a recorded area is included (Yes), the procedure goes to step S307. When it is determined that no recorded area is included (No), the process goes to step S308.

Step S307: the CPU 514 controls the servo circuit 509 to set a reproduction position to the recorded area found on the optical disc 501 in step S306. The servo circuit 509 optionally drives the transport support 507 and the actuator 504 to change an access position of the optical head apparatus 540.

Step S308: the CPU 514 controls the servo circuit 509 to set a reproduction position on the optical disc 501 to the OPC area 104. The servo circuit 509 optionally drives the transport support 507 and the actuator 504 to change an access position of the optical head apparatus 540.

Step S309: the CPU 514 controls the optical head apparatus 540 so that the optical head apparatus 540 records data into at least one area of the optical disc 501.

Specifically, the CPU 514 reads out a recording pulse control parameter (access means control data for controlling the optical head apparatus 540), which is previously recorded in the PIC area 101, and sets the parameter into the laser drive circuit 505. Thereafter, the CPU 514 generates random data in the buffer 513. Further, the CPU 514 controls the ECC circuit 512 and the modulation/demodulation circuit 511 to output data in the buffer 513 to the laser drive circuit 505. The laser drive circuit 505 controls a laser power and a recording pulse width based on the recording pulse control parameter to convert the modulated data signal 533 into a light pulse. By irradiating the optical disc 501 with the light pulse, data is recorded onto the optical disc 501.

As described above, a recorded area for reproduction adjustment is generated in the OPC area 104 on the optical disc 501.

Step S310: the CPU 514 controls the optical head apparatus 540 so that the optical head apparatus 540 accesses a recorded area (recorded area found in search or the OPC area 104). Further, the CPU 514 controls the optical head apparatus 540 based on the result of access to the recorded area.

Specifically, the CPU 514 transmits an instruction for the servo circuit 509 to perform focus position adjustment. The servo circuit 509 controls the actuator 504 to change a focus position and also measures a jitter value based on the servo error signal 524 received from the preamplifier 508. The servo circuit 509 repeats the operation to search for a focus position which minimizes the jitter value and sets the focus position to an internal focus offset.

When it is determined that a recorded area is included (see step S306), jitter measurement will be performed in the recorded area found in the search. The CPU 514 controls the optical head apparatus 540 based on the result of access to the recorded area found in the search.

When it is determined that no recorded area is included (see step S306), jitter measurement will be performed in the OPC area 104 (recorded area for reproduction adjustment).

Step S311: the CPU 514 transmits an instruction for the servo circuit 509 to perform tilt adjustment. The servo circuit 509 changes a tilt state of the lens 503 by controlling the actuator 504, and also measures a jitter value based on the servo error signal 524 received from the preamplifier 508. The servo circuit 509 repeats the operation to search for a tilt setting which minimizes a jitter value and sets such a tilt setting therewithin.

As described above, according to the startup procedure 1 of Embodiment 1 of the present invention, the recorded area searching step of determining whether or not a recorded area is present is provided, thereby making it possible to eliminate a time required for creating a recorded area for reproduction adjustment when such a recorded area has already been present. As a result, an optical disc can be started up quickly.

Further, even when no recorded area is present on an optical disc, the reproduction adjustment area recording step can be employed to perform reproduction adjustment on such an optical disc using a conventional reproduction quality indicator (e.g., a jitter value, etc.).

In the example described with reference to FIG. 3, step S305 and step S306 correspond to "determining whether or not at least one area includes at least one first recorded area in which data has been recorded" (searching the optical disc 501 for a recorded area). Step S308 and step S309 correspond to "when it is determined that the at least one area does not include the at least one first recorded area, controlling an access means to record data into at least one of the at least one area" (when no recorded area is present on the optical disc 501, creating a recorded area for reproduction adjustment). Step S310 and step S311 correspond to "when it is determined that the at least one area includes the at least one first recorded area, controlling the access means based on a result of access to the at least one first recorded area" or "when it is not determined that the at least one area does not include the at least one first recorded area, controlling the access means so that the access means accesses the at least one second recorded area in which data has been recorded by the access means, based on a result of access to the at least one second recorded area" (performing reproduction adjustment for adjusting a control parameter required for reproduction).

However, the startup procedure 1 of Embodiment 1 of the present invention is not limited to that shown in FIG. 3. Any startup procedure can fall within the scope of the present invention as long as it can achieve the functions of the above-described steps.

For example, in the example described with reference to FIG. 3, the recording pulse control parameter stored in the PIC area 101 is used to create a recorded area (step S309). However, the present invention is not limited to this. Any appropriate recording pulse control parameter may be used.

For example, the recording/reproduction apparatus 500 comprises a non-volatile memory. The non-volatile memory stores access means control data for controlling the optical head apparatus 540. The CPU 514 controls the optical head apparatus 540 based on the access means control data stored in the non-volatile memory.

For example, a recording pulse control parameter may be adjusted and optimized while recording is actually performed in the OPC area 104 and a result of the adjustment may be used.

For example, in the example described with reference to FIG. 3, when no recorded area is present, a reproduction adjustment area is created (steps S308, S309). However, in a reproduction-only apparatus which performs only reproduction, no reproduction adjustment area can be created. The CPU 514 included in the reproduction-only apparatus controls the optical head apparatus 540 so that the optical head apparatus 540 reproduces an unrecorded area. The CPU 514 controls the optical head apparatus 540 based on a result of the reproduction of the unrecorded area. For example, a tracking error signal which indicates a deviation of a light beam spot from a track is generated based on the servo error signal 524 obtained by the reproduction of the unrecorded area. A reproduction control parameter is adjusted so that an amplitude of the tracking error signal is maximized.

For example, when the reproduction-only apparatus comprises a non-volatile memory, a reproduction control parameter stored in the non-volatile memory may be used to adjust the optical head apparatus 540. For example, a higher-level apparatus, such as a host computer or the like, may be informed that reproduction cannot be performed.

Note that the process, which is performed when no recorded area is present, is not limited to this.

For example, in the example described with reference to FIG. 3, servo control parameters, such as a focus position and a tilt, have been described. However, reproduction parameters are not limited to these. Other examples of servo control parameter adjustment may include adjustment of a beam expander for correcting spherical aberration, adjustment of an offset of a servo circuit, adjustment of an offset of stray light, and adjustment of a gain of a servo signal. For example, a slice level may be adjusted when an analog signal is converted to a digital (binary) signal, or an attenuator value may be adjusted to optimize an amplification rate of a reproduction signal. In other words, a signal processing system adjustment may be performed. For example, an offset of a laser circuit may be adjusted, or a gain of a laser-system control loop may be adjusted. In other words, laser system adjustment may be performed. Further, the number of reproduction parameters to be adjusted is not limited to two. One or more reproduction parameters may be adjusted.

For example, in the example described with reference to FIG. 3, a focus position and a tilt setting are searched for, which minimize a jitter value (steps S310, S311). Any method for adjusting an appropriate focus position and tilt setting may be used. For example, they may be adjusted to minimize an MLSE (Maximum Likelihood Sequence Error).

1-4. Recorded Area Search Procedure 1

Figure 4:
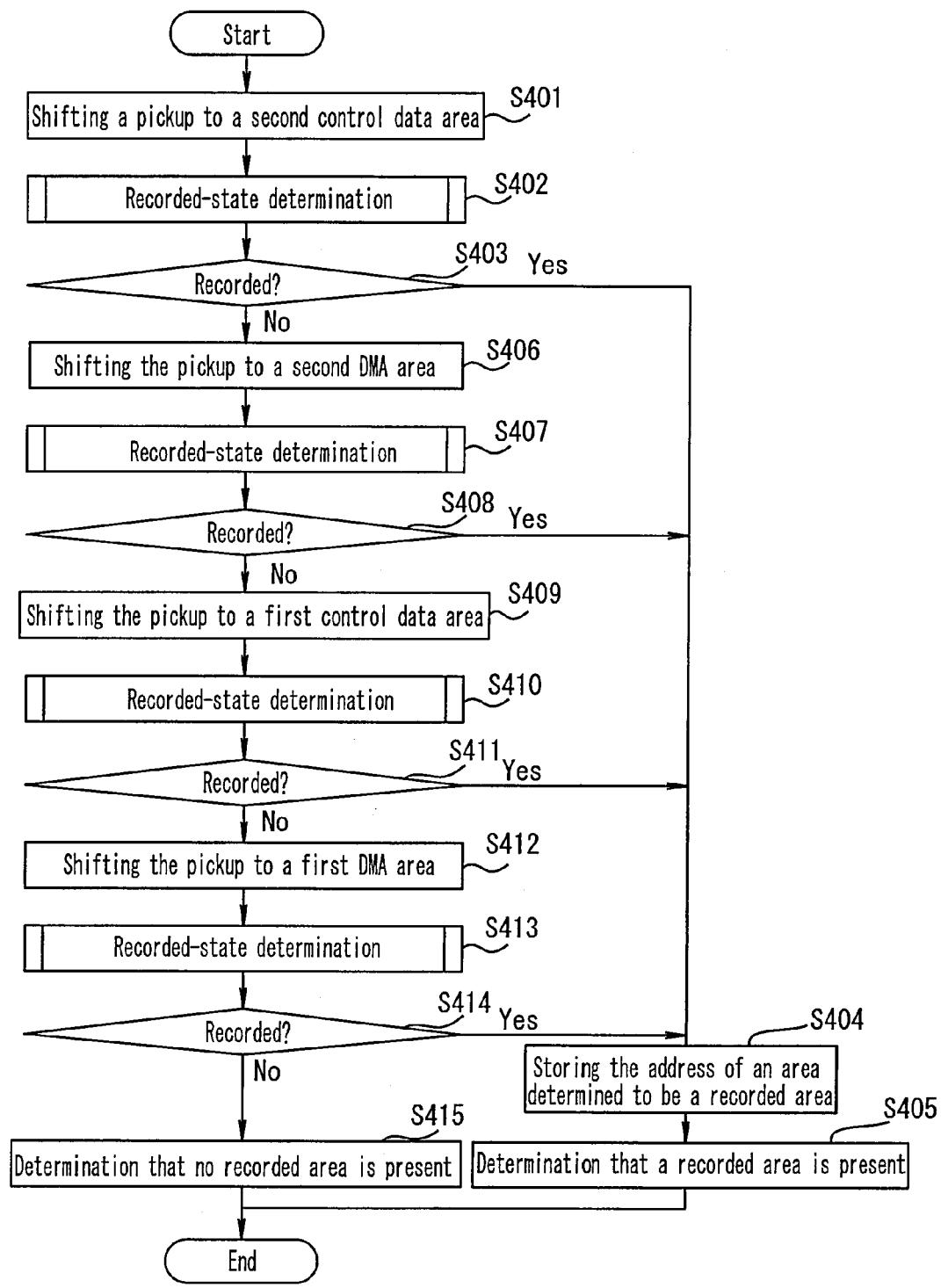
FIG. 4 is a flowchart showing a recorded area search procedure according to Embodiment 1 of the present invention.

FIG. 4 shows a recorded area search procedure 1 according to Embodiment 1 of the present invention.

Hereinafter, the recorded area search procedure 1 of Embodiment 1 of the present invention will be described step by step with reference to FIGS. 1, 2 and 4. The recorded area search procedure 1 of Embodiment 1 of the present invention is performed by the CPU 514.

Step S401: the CPU 514 controls the servo circuit 509 so that a reproduction position on the optical disc 501 is set within the second control data area 123. The servo circuit 509 drives the transport support 507 and the actuator 504, as required, to change the reproduction position of a light spot.

Step S402: a recorded-state determination procedure is performed. For example, based on a signal reproduced from the second control data area 123, the CPU 514 determines whether or not the second control data area 123 is a recorded area.

The recorded-state determination procedure (step S402) will be described elsewhere below.

Step S403: when it is determined that the second control data area 123 is a recorded area (Yes), the procedure goes to step S404. When it is determined that the second control data area 123 is an unrecorded area (No), the procedure goes to step S406.

Step S404: the CPU 514 stores an address, which is positional information of the area determined to be a recorded area, into an internal memory thereof. The reason the address is stored is that the area is used to perform subsequent reproduction adjustment.

Step S405: the CPU 514 has detected the recorded area, and therefore, determines that the optical disc 501 is a disc having a recorded area. The recorded area search procedure is ended.

Step S406: the CPU 514 controls the servo circuit 509 so that a reproduction position on the optical disc 501 is set within the second DMA area 122. The servo circuit 509 drives the transport support 507 and the actuator 504, as required, to change the reproduction position of a light spot.

Step S407: the recorded-state determination procedure is performed. For example, based on a signal reproduced from the second DMA area 122, the CPU 514 determines whether or not the second DMA area 122 is a recorded area.

Step S408: when it is determined that the second DMA area 122 is a recorded area (Yes), the procedure goes to step S404. When it is determined that the second DMA area 122 is an unrecorded area (No), the procedure goes to step S409.

Step S409: the CPU 514 controls the servo circuit 509 so that a reproduction position on the optical disc 501 is set within the first control data area 135. The servo circuit 509 drives the transport support 507 and the actuator 504, as required, to change the reproduction position of a light spot.

Step S410: the recorded-state determination procedure is performed. For example, based on a signal reproduced from the first control data area 135, the CPU 514 determines whether or not the first control data area 135 is a recorded area.

Step S411: when it is determined that the first control data area 135 is a recorded area (Yes), the procedure goes to step S404. When it is determined that the first control data area 135 is an unrecorded area (No), the procedure goes to step S412.

Step S412: the CPU 514 controls the servo circuit 509 so that a reproduction position on the optical disc 501 is set within the first DMA area 134. The servo circuit 509 drives the transport support 507 and the actuator 504, as required, to change the reproduction position of a light spot.

Step S413: the recorded-state determination procedure is performed. For example, based on a signal reproduced from the first DMA area 134, the CPU 514 determines whether or not the first DMA area 134 is a recorded area.

Step S414: when it is determined that the first DMA area 134 is a recorded area (Yes), the procedure goes to step S404. When it is determined that the first DMA area 134 is an unrecorded area (No), the procedure goes to step S415.

Step S415: the CPU 514 determines that the optical disc 501 has no recorded area. The recorded area search procedure is ended. This is because no recorded area is found, though all areas are searched which are located in an inner peripheral area. The inner peripheral area is one of the areas which have a high probability of being recorded areas (at least one defect management area (DMA area) which stores defect management information for controlling a defective area on an optical disc and at least one control data area which stores control information).

Thus, according to the recorded area search procedure 1 of Embodiment 1 of the present invention, only areas which have a high probability of being recorded areas are searched for a recorded area, thereby making it possible to efficiently determine whether or not a disc is a recorded disc.

Further, according to the recorded area search procedure 1 of Embodiment 1 of the present invention, a recorded-state test is performed for the second control data area 123, the second DMA area 122, the first control data area 135 and the first DMA area 134 in this order. Therefore, even if any of the areas is recognized as an unrecorded area due to a local defect (e.g., a scratch on a medium, etc.), a recorded area can be search for.

In the recorded area search procedure 1 of Embodiment 1 of the present invention, only the inner peripheral portion is searched in order to reduce the search time. However, an area located at an outer peripheral portion (the third DMA area 142, the third control data area 143, the fourth DMA area 145, and the fourth control data area 146) may be searched. Also, a search procedure for any of the areas may be omitted in order to reduce the search time.

Although the recorded area search procedure 1 of Embodiment 1 of the present invention is performed sequentially from the second INFO area 103 located in the inner peripheral portion, the search can be more efficiently performed by starting from an area currently closest to the optical head apparatus 540. Therefore, the sequence of the areas to be searched is not limited to that described in the flowchart of FIG. 4. Steps S402, S407, S410 and S413 perform the same determination procedure, except that different areas are subjected to the recorded-state test.

Hereinafter, details of a recorded-state determination procedure (steps S402, S407, S410 and S413) for determining whether or not a searched area is a recorded area, will be described.

1-5. Recorded-state Determination Procedure 1

Figure 5:
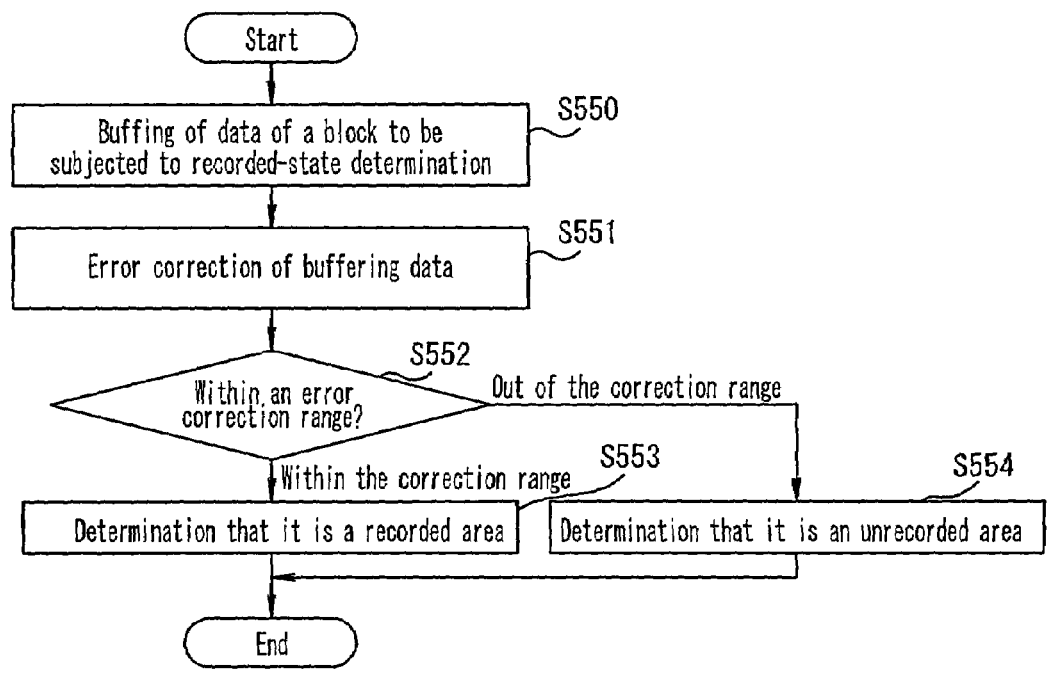
FIG. 5 is a flowchart showing a recorded-state determination procedure according to Embodiment 1 of the present invention.

FIG. 5 shows a recorded-state determination procedure 1 according to Embodiment 1 of the present invention.

Hereinafter, the recorded-state determination procedure 1 of Embodiment 1 of the present invention will be described step by step with reference to FIGS. 2 and 5. In the recorded-state determination procedure 1, the CPU 514 controls the optical head apparatus 540 so that data is reproduced from an optical disc, and determines whether or not the data has been normally reproduced. Based on the determination of whether or not the data has been normally reproduced, the CPU 540 determines whether or not a recorded area is contained in the optical disc.

Step S550: the CPU 514 controls the servo circuit 509 so that the optical head apparatus 540 is shifted to an area which is to be subjected to recorded-state determination. Further, the CPU 514 controls the binary circuit 510, the modulation/demodulation circuit 511, and the ECC circuit 512 so that data of the area, which is to be subjected to recorded-state determination, is stored into the buffer 513. In this case, digital (binary) data obtained by the binary circuit 510 is demodulated by the modulation/demodulation circuit 511, and the ECC circuit 512 stores modulated data, which is output from the modulation/demodulation circuit 511, directly to the buffer 513.

Step S551: the ECC circuit 511 performs error correction for the modulated data stored in the buffer 513. When an area subjected to a recorded-state test is a recorded area, data errors may occur to a slight extent, but data containing errors within an error correction range is typically stored in the buffer 513. Thereafter, such data errors can be corrected. When a tested area is an unrecorded area or when recording quality is significantly poor, a large amount of data errors may occur that exceeds the correction limit of the error correction code.

Step S552: buffering data error correction step. As a result of step S551, when the data errors are within an error correction range and error correction can be performed, the procedure goes to step S553. When the amount of data errors exceeds the error correction limit and error correction cannot be performed, the procedure goes to step S554.

Step S553: the CPU 514 determines that the area subjected to the recorded-state test is a recorded area. The procedure is ended.

Step S554: the CPU 514 determines that the area subjected to the recorded-state test is an unrecorded area. The procedure is ended.

As described above, according to the recorded-state determination procedure 1 of Embodiment 1 of the present invention, determination is performed by reproducing data. Therefore, no additional function is required other than the reproduction function processed by an information reproduction apparatus. Therefore, the recorded-state determination procedure 1 of Embodiment 1 of the present invention can be easily implemented.

In the recorded-state determination procedure 1 of Embodiment 1 of the present invention, it is determined whether or not the data errors are within the error correction range. The present invention is not limited to this as long as it can be determined whether or not a recorded data is present, based on error correction codes. An LDC (Long Distance Code) codeword, which is a physical error correction unit, may be utilized. For example, a threshold may be provided for the number of LDC code words which cannot be corrected.

1-6. Recorded-state Determination Procedure 2

Figure 6:
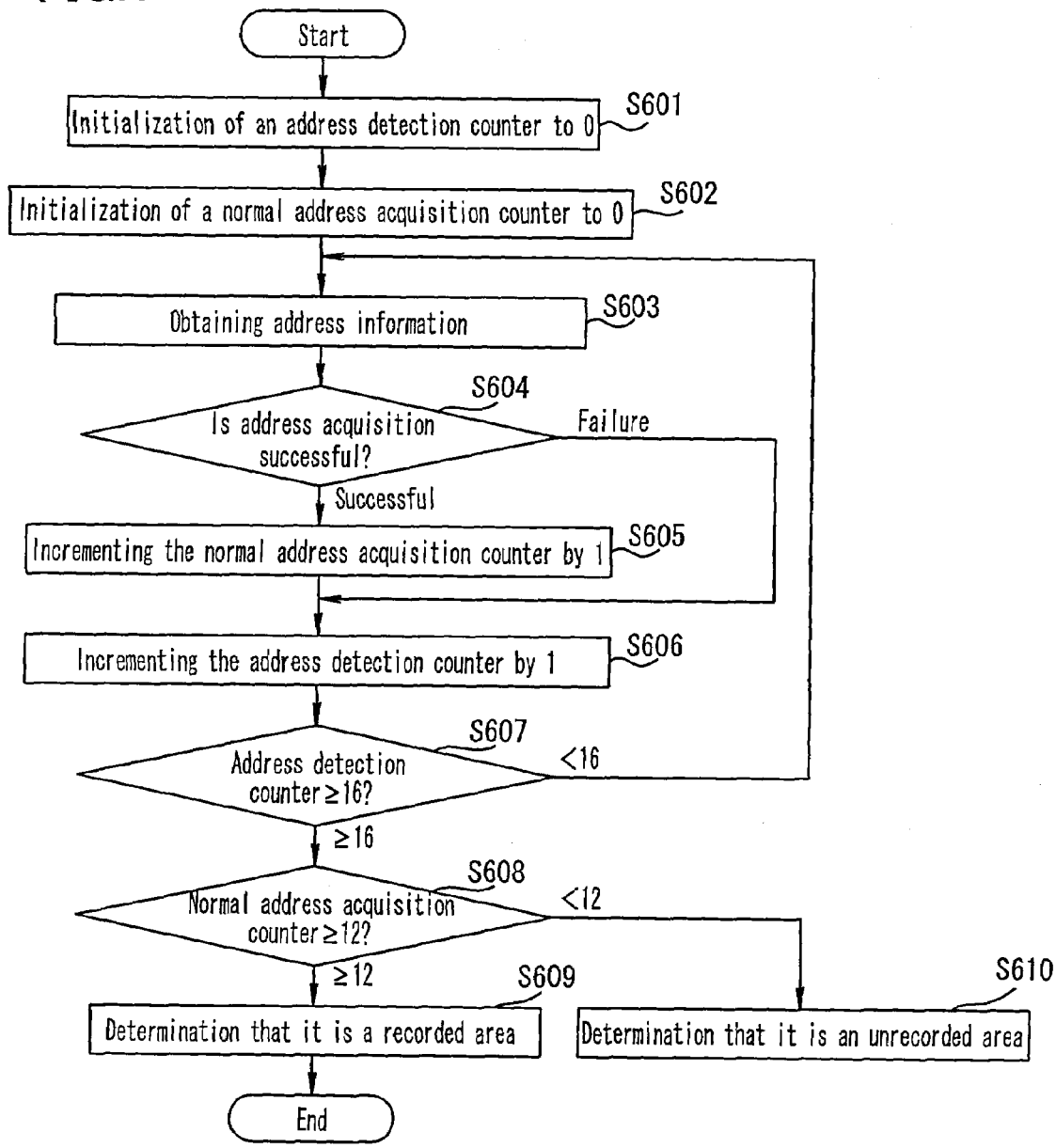
FIG. 6 is flowchart showing another recorded-state determination procedure according to Embodiment 1 of the present invention.

FIG. 6 shows a recorded-state determination procedure 2 according to Embodiment 1 of the present invention.

Hereinafter, the recorded-state determination procedure 2 of Embodiment 1 of the present invention will be described step by step with reference to FIGS. 2 and 6. In the recorded-state determination procedure 2, the CPU 514 performs recorded-state determination based on the state of acquisition of subcode information containing address information and user data. Particularly, in BDs, information having strong error correction capability called BIS (Burst Indicating Subcode) is recorded as subcode information.

Step S601: the CPU 514 allocates an address detection counter in an internal RAM area thereof. The value of the counter is initialized to 0. As used herein, the address detection counter is a counter which is incremented every time an optical pickup passes through a disc area corresponding to a physical sector (one address) no matter whether or not the address is normally reproduced.

Step S602: the CPU 514 allocates a normal address acquisition counter in the internal RAM area. The value of the counter is initialized to 0. As used herein, the normal address acquisition counter is incremented only if address information, which is acquired when the optical pickup passes through one physical sector (one address), is normal.

Step S603: the CPU 514 controls the binary circuit 510, the modulation/demodulation circuit 511, and the ECC circuit 512 to obtain address information stored in subcode information of an area to be subjected to a recorded-state test. The ECC circuit 512 extracts the address information from demodulated data obtained from the modulation/demodulation circuit 511. The subcode information contains a strong error correction/detection signal. The ECC circuit 512 informs the CPU 514 every time an address is obtained, and transmits the result of an error correction of the obtained address information. In this case, when the error correction result indicates an error, the CPU 514 is informed of the address error.

Step S604: when the CPU 514 determines, based on the address error detection result received from the ECC circuit 512, that an address has been read out normally (successfully), the procedure goes to step S605. When it is determined that an error is detected in the obtained address (failure), the procedure goes to step S606.

Step S605: when a normal address has been obtained without detecting an address error, the CPU 51 increments the normal address acquisition counter by 1.

Step S606: no matter whether or not the address acquisition is successful, the CPU 514 increments the address detection counter by 1, indicating a measured address.

Step S607: it is determined whether or not the total number of measured addresses reaches a predetermined number.

For example, in the case of BD, address information called AUN (Address Unit Number) is recorded with data in an interleaved manner. Sixteen AUNs are contained in a cluster which is a unit of recording/reproduction of a medium. Therefore, in the case of BD, the predetermined number of addresses is considered to be 16 for the purpose of testing one cluster of areas. When the value of the address detection counter is less than 16, one cluster of areas has not been completely tested, so that the procedure returns to step S603. When the value of the address detection counter is 16 or more, one cluster of areas has already been completely tested, and the procedure goes to step S608.

Step S608: the CPU 514 checks the value of the normal address acquisition counter at the time of completion of testing one cluster of areas. When the normal address acquisition counter value is less than a predetermined value (e.g., 12), the procedure goes to step S610. When the normal address acquisition counter value is the predetermined value or more, the procedure goes to step S609.

Step S609: the predetermined number or more of addresses have been normally obtained, and therefore, the CPU 514 determines that the tested area is a recorded area. The procedure is ended.

Step S610: the number of addresses normally obtained is less than the predetermined number, and therefore, the CPU 514 determines that the tested area is an unrecorded area. The procedure is ended.

As described above, by using subcode information having strong error correction capability for recorded-state determination, it is possible to achieve highly reliable recorded-state determination even when reproduction adjustment is not yet performed partway through apparatus adjustment.

In the example described with reference to FIG. 6, the address detection counter value is set to 16 which corresponds to the number of areas contained in one cluster of a BD. However, the number of addresses to be tested may vary depending on the size of a recorded area required for reproduction adjustment. Also, in the example described with reference to FIG. 6, a criterion for determination of a recorded area is 12 to 16 addresses. However, such a number may vary depending on the address reproduction quality.

The above-described recorded-state determination procedure 2 is not ended until the predetermined number of addresses have been tested. The present invention is not limited to this as long as the recorded state is tested based on the address reproduction state. For example, the procedure may be ended when a predetermined number of normal addresses have been confirmed or when an address larger than a predetermined address has been obtained.

In the above-described recorded-state determination procedure 2, only AUN stored in subcode information of a BD has been described. The present invention is not limited to this. Any address information recorded along with data may be used. For example, in the case of DVD media, a data ID recorded at the head of each sector may be used. In the case of CD media, an address recorded along with data in a sub-channel (generally referred to as a Sub-Q address) may be used.

1-7. Recorded-state Determination Procedure 3

Figure 7:
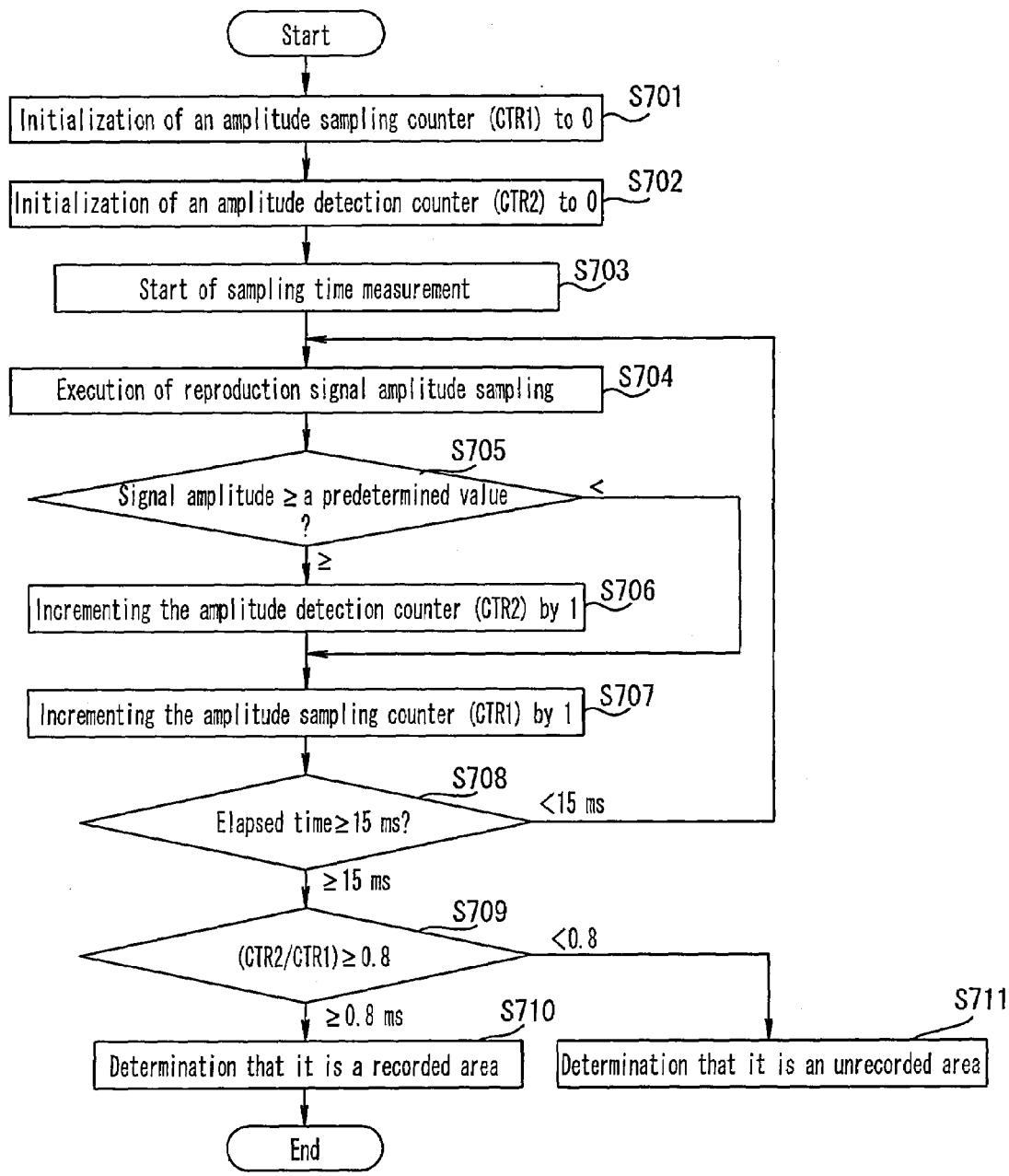
FIG. 7 is flowchart showing still another recorded-state determination procedure according to Embodiment 1 of the present invention.

FIG. 7 shows a recorded-state determination procedure 3 according to Embodiment 1 of the present invention.

Hereinafter, the recorded-state determination procedure 3 according to Embodiment 1 of the present invention will be described step by step with reference to FIGS. 2 and 7. In the recorded-state determination procedure 3, the CPU 514 controls the optical head apparatus 540 so that the optical head apparatus 540 irradiates an optical disc with light and detects light reflected from the optical disc, and based on the amount of detected light, determines whether or not the optical disc has a recorded area.

Step S701: the CPU 514 instructs the servo circuit 509 to measure an amplitude of a reproduction signal and specifies the measurement time. The measurement time is, for example, 15 ms corresponding to one cluster which is a unit of recording/reproduction of BD. After reception of the instruction, the servo circuit 509 allocates an amplitude sampling counter (CTR1) in an internal RAM area thereof, and initializes the counter value to 0. The amplitude sampling counter is, for example, a counter which is incremented by 1 every time the reproduction signal amplitude is sampled (e.g., an envelope signal obtained by processing an AS (All Sum) signal which is a sum of the total amount of light received by the photodetector 506 with a lowpass filter).

Step S702: the servo circuit 509 allocates an amplitude detection counter (CTR2) in the internal RAM area, and initializes the counter value to 0. The amplitude detection counter is, for example, a counter which is incremented by 1 when the reproduction signal amplitude is sampled and the sampled amplitude value is greater than or equal to a predetermined value.

Step S703: the servo circuit 509 controls a timer resource possessed therewithin to measure a sampling time. The timer resource is used for measuring a cycle of sampling the reproduction signal amplitude and stopping sampling in a time designated by the CPU 514 (e.g., 15 ms).

Step S704: the servo circuit 509 performs a wait process based on an internal timer until the sampling cycle passes, and performs acquisition of a reproduction signal amplitude at the timing of sampling.

Step S705: the servo circuit 509 determines whether or not the reproduction signal amplitude obtained by sampling in step S704 is larger than a predetermined amplitude level. When the reproduction signal amplitude is greater than or equal to a predetermined value, the procedure goes to step S706. When the reproduction signal amplitude is less than the predetermined level, the procedure goes to step S707.

Step S706: the servo circuit 509 increments the amplitude detection counter (CTR2) by 1.

Step S707: the servo circuit 509 increments the amplitude sampling counter (CTR1) by 1.

Step S708: the servo circuit 509 references a timer value internally measured, and determines whether or not an elapsed time after activation of the timer is greater than or equal to a predetermined value. For example, the predetermined time designated by the CPU 514 is 15 ms. In this case, when the elapsed time is 15 ms or more, the procedure goes to step S709. On the other hand, when the elapsed time is less than 15 ms, the procedure returns to step S704, where sampling is continued.

Step S709: the servo circuit 509 reports values of the amplitude detection counter (CTR2) and the amplitude sampling counter (CTR1) to the CPU 514. After reception of the report, the CPU 514 determines whether or not the value of (CTR2/CTR1) is greater than or equal to a predetermined value. When the value is greater than or equal to a predetermined value, the procedure goes to step S710. When the value is less than the predetermined value, the procedure goes to step S711. For example, the predetermined value (criterion) is 0.8.

Step S710: the CPU 514 determines that a tested area is a recorded area.

Step S711: the CPU 514 determines that a tested area is an unrecorded area.

As described above, in the recorded-state determination procedure 3 of Embodiment 1 of the present invention, the CPU 514 controls the optical head apparatus 540 so that the optical head apparatus 540 irradiates an optical disc with light and detects light reflected from the optical disc. Based on the amount of detected light, the CPU 514 also determines whether or not a recorded area is contained in the optical disc. For example, the determination is performed with reference to the amplitude of a reproduction signal. Therefore, it is possible to confirm information about whether an optical disc is truly an unrecorded or recorded optical disc.

In the above-described recorded-state determination procedure 3, the sampling time is, for example, 15 ms which corresponds to one cluster of BD. However, the measurement time may vary depending on the size of a recorded area required for reproduction adjustment. Also, the value of (CTR2/CTR1) which is a criterion of determination is, for example, 0.8. However, such a value may be changed since the quality of a reproduction signal varies from apparatus to apparatus. The determination criterion is not limited to the value of (CTR2/CTR1) and may be, for example, the value of CTR2.

The recorded-state determination procedures 1 to 3 have been described with reference to FIGS. 5 to 7. These procedures may be used in combination as well as exclusively. For example, an area may be determined to be a recorded area when that area has a sampled reproduction signal amplitude which is greater than or equal to a predetermined value and the area can be reproduced.

The present invention is not limited to the recorded-state determination procedures 1 to 3. Any recorded-state determination procedure, which can determine whether or not an area is a recorded area, can be used. For example, a jitter value or an MLSE value, which are signal indicators for an area to be determined, may be measured and these values may be used as indicators for determination.

Although an BD-RE optical disc has been described as an exemplary rewritable optical disc, a write-once BD-R optical disc (described below) has almost the same area arrangement as the BD-RE optical disk, including an OPC area and the like. For example, in a write-once optical disc, such as a BD-R or the like, when areas corresponding to the first to fourth control data areas (the areas 135, 123, 143, and 146) are used as areas to be recorded when physical formatting is performed, but not the first to fourth DMA areas (the areas 134, 122, 142, and 145) and these areas are searched for when startup is performed, the present invention can be applied to such a write-once optical disc.

2. Embodiment 2

2-1. Write-once Optical Disc

Figure 8:
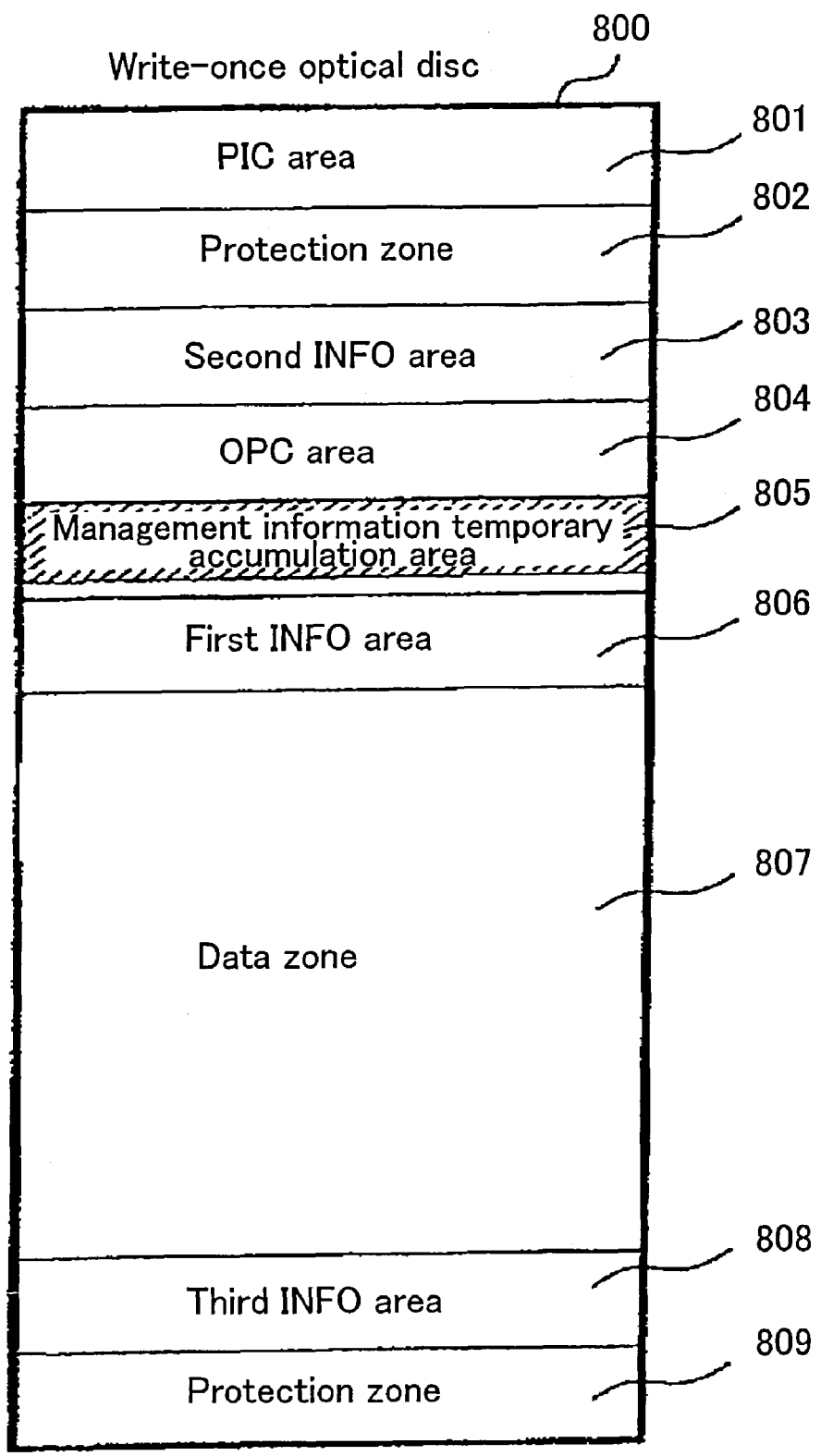
FIG. 8 is a diagram showing a data structure of a write-once optical disc.

FIG. 8 shows a data structure of a write-once optical disc 800.

The write-once optical disc 800 contains a PIC (Permanent Information and Control data) area 801, a protection zone 802, a protection zone 809, an OPC (Optimum Power Calibration) area 804, a first INFO area 806, a second INFO area 803, a third INFO area 808, a management information temporary accumulation area 805, and a data zone 807.

For example, a largest address of the data zone 807 and a recording pulse control parameter are recorded in the PIC area 801. In the PIC area 101, information is recorded in the form of wobble of a track, and thus, such a data recording method is different from ordinary data recording methods which form a mark on a recording film of a track. Therefore, a reproduction signal quality indicator, such as jitter or the like, cannot be measured in the PIC area 801.

The protection zone 802 and the protection zone 809 are used to prevent overrun of a pickup and are not used to record/reproduce data.

The first INFO area 806, the second INFO area 803 and the third INFO area 808 store defect management information and control information. These areas have almost the same data structure as the respective structure of the first INFO area 106, the second INFO area 103 and the third INFO area 108 of the rewritable optical disc 100 described above, and will not be explained.

Hereinafter, differences between the rewritable optical disc 100 and the write-once optical disc 800 will be described.

As already described with reference to FIG. 1, data is recorded into an n-th DMA area and an n-th control data area (n=1, 2, 3, 4) of the rewritable optical disc 100 when a physical formatting process is performed before use. Data rewrite is possible in the rewritable optical disc 100. Therefore, for example, when a new defective area is detected, data in the n-th DMA area can be updated to the latest information.

In the case of the write-once optical disc 800, once recorded, data cannot be overwritten. As described above, Embodiment 1 can be applied to the write-once optical disc 800 if the n-th control data area is used as a recorded area when the disc is initialized. In Embodiment 2, recording of the n-th DMA area and the n-th control data area is performed only during finalization in which a disc is converted to a reproduction-only disc. When the write-once optical disc 800 is used in a state which allows incremental recording, all of the first INFO area 806, the second INFO area 803, and the third INFO area 808 are unrecorded areas.

The OPC area 804 is an area which is used for test recording. Test recording is performed by a recording apparatus, which will perform recording on the write-once optical disc 800, to adjust a recording laser power, a pulse width or the like.

The management information temporary accumulation area 805 is an area in which defect management information, recording management information or the like is temporarily accumulated, since the first INFO area 806, the second INFO area 803 and the third INFO area 808 are used only for finalization. Thus, the management information temporary accumulation area 805 is a type of defect management area. The management information temporary accumulation area 805 is used from an inner peripheral portion thereof to an outer peripheral portion thereof. That is, management information recorded later is recorded in a more outer portion of the area. Thus, the latest management information is recorded at a tail end portion of a recorded area of the management information temporary accumulation area 805. The management information temporary accumulation area 805 is updated, for example, when a new defective area is detected.

The data zone 807 is an area in which user data is recorded.

As described above, it is possible that all areas of the rewritable optical disc 800 are unrecorded areas when shipped. However, the management information temporary accumulation area 805 is an area in which data is recorded sequentially from an inner peripheral portion thereof and a recorded area can be detected with high possibility (hatched portions in FIG. 8).

The configuration of an apparatus for recording/reproducing data to/from the write-once optical disc 800 is similar to that of the recording/reproduction apparatus 500 (see FIG. 2) and will not be explained.

A startup procedure 2 for starting up the write-once optical disc 800 by the recording/reproduction apparatus 500 is similar to the startup procedure 1 (see FIG. 3) and will not be explained. Note that the startup procedure 1 is different from the startup procedure 2 in the details of the recorded area search procedure (step S305).

2-2. Recorded Area Search Procedure 2

Figure 9:
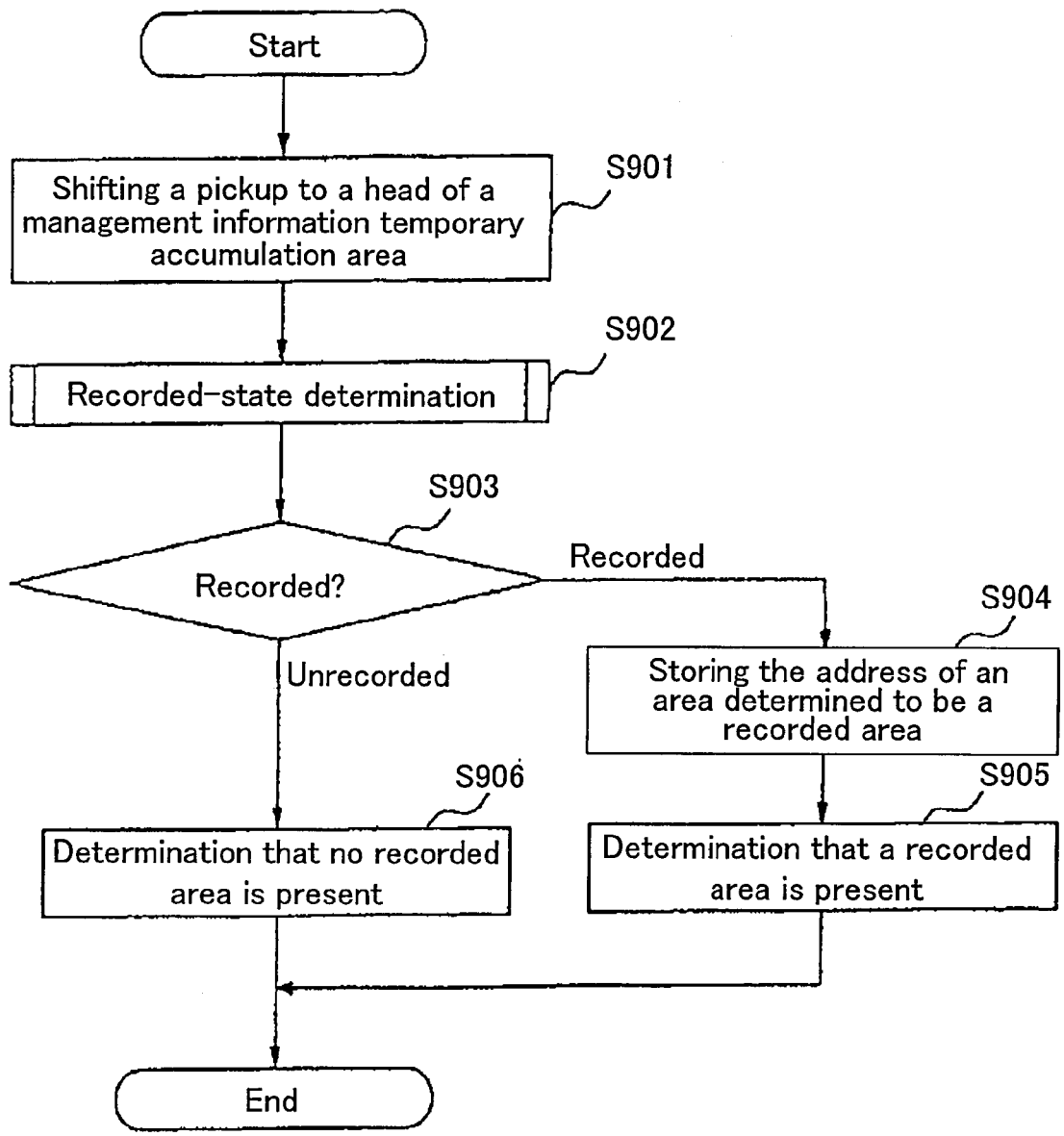
FIG. 9 is a flowchart showing a recorded area search procedure according to Embodiment 2 of the present invention.

FIG. 9 shows a recorded area search procedure 2 according to Embodiment 2 of the present invention.

Hereinafter, the recorded area search procedure 2 of Embodiment 2 of the present invention will be described step by step with reference to FIGS. 2, 8 and 9. The recorded area search procedure 2 of Embodiment 2 of the present invention is performed by the CPU 514.

Step S901: the CPU 514 controls the servo circuit 509 so that a reproduction position on the write-once optical disc 800 is located at a head of the management information temporary accumulation area 805. The servo circuit 509 drives the transport support 507 and the actuator 504, as required, to change the reproduction position of a light spot.

Step S902: a recorded-state determination procedure is performed. For example, based on a signal reproduced from the management information temporary accumulation area 805, the CPU 514 determines whether or not the management information temporary accumulation area 805 is a recorded area. Note that details of the recorded-state determination procedure (step S902) are similar to those of any of the recorded-state determination procedures described with reference to FIGS. 5 to 7 and will not be explained.

Step S903: when it is determined that the management information temporary accumulation area 805 is a recorded area in the recorded-state determination step (step S902), the procedure goes to step S904. When it is determined that the management information temporary accumulation area 805 is an unrecorded area, the procedure goes to step S906.

Step S904: the CPU 514 stores an address, which is positional information of the management information temporary accumulation area 805 determined to be a recorded area, into an internal memory thereof. The reason the address is stored is that the management information temporary accumulation area 805 is used to perform subsequent reproduction adjustment.

Step S905: the CPU 514 has detected the recorded area, and therefore, determines that the write-once optical disc 800 is a disc having a recorded area. The recorded area search procedure is ended.

Step S906: the CPU 514 determines that the write-once optical disc 800 is a disc having no recorded area.

According to the recorded area search procedure 2, it is determined whether or not the management information temporary accumulation area 805, which has the highest probability of the presence of a recorded area in the write-once optical disc 800, is a recorded area. Thereby, a recorded area can be searched for quickly.

In addition to the recorded area search procedure 2, in the data zone 807 data is often recorded from an inner peripheral portion thereof in accordance with the properties of the write-once optical disc 800. Therefore, for example, a head area of the data zone 807 may be searched for a recorded area.

3. Embodiment 3

3-1. Double Layer Rewritable Optical Disc

Figure 10:
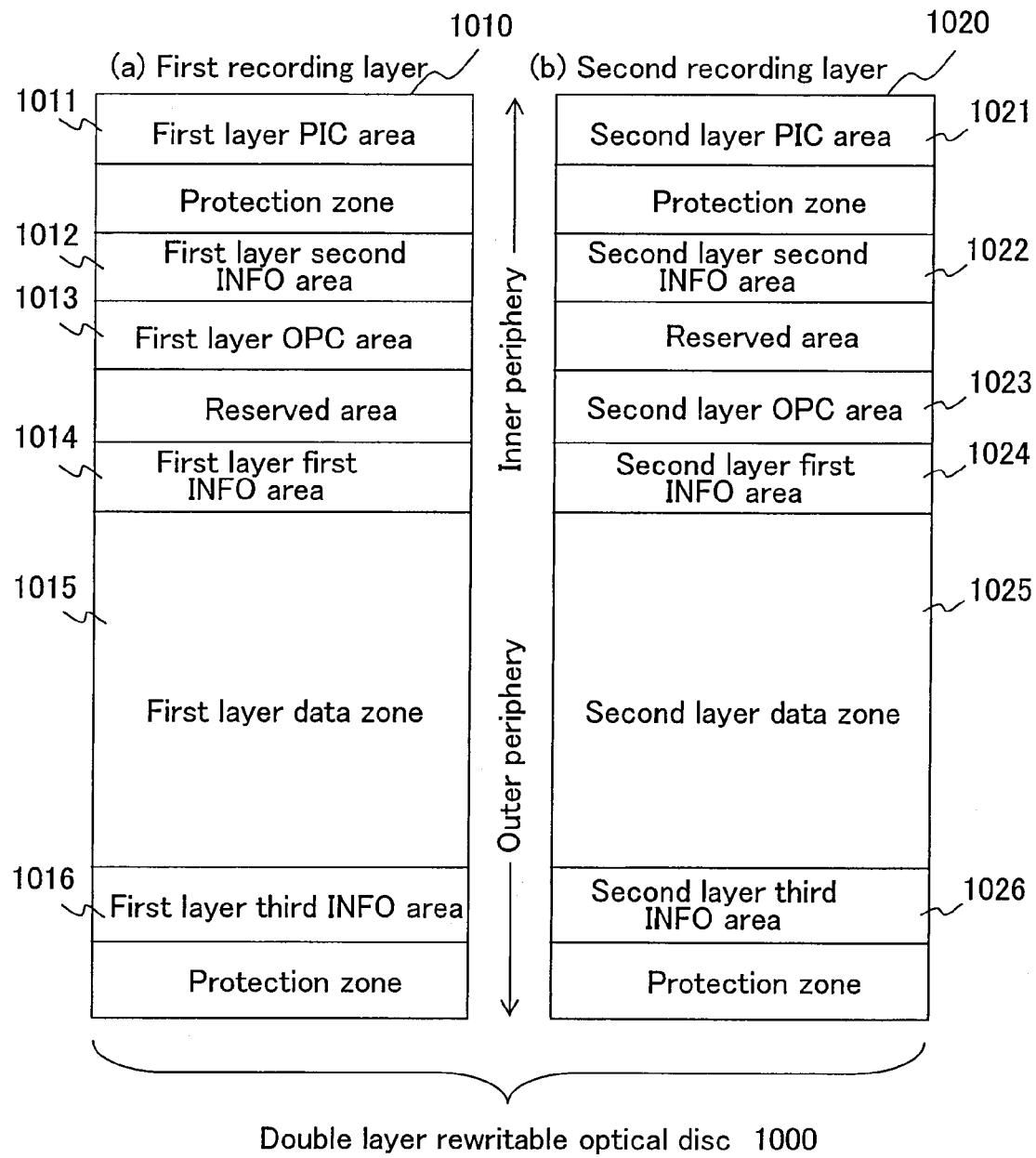
FIG. 10 is a diagram showing a data structure of a double layer rewritable optical disc.

FIG. 10 shows a data structure of the double layer rewritable optical disc 1000.

The double layer rewritable optical disc 1000 comprises a first recording layer 1010 and a second recording layer 1020. The first recording layer 1010 and the second recording layer 1020 are attached together in a manner that makes it possible to access the two layers from the same direction.

The first recording layer 1010 comprises a first layer PIC area 1011, a first layer second INFO area 1012, a first layer OPC area 1013, a first layer first INFO area 1014, a first layer data zone 1015, and a first layer third INFO area 1016. The first recording layer 1010 has a data structure similar to that of the rewritable optical disc 100 (see FIG. 1), and since their correspondence is clear, will not be explained.

The second recording layer 1020 comprises a second layer PIC area 1021, a second layer second INFO area 1022, a second layer OPC area 1023, a second layer first INFO area 1024, a second layer data zone 1025, and a second layer third INFO area 1026. The second recording layer 1020 has a data structure similar to that of the rewritable optical disc 100 (see FIG. 1), and since their correspondence is clear, will not be explained.

3-2. Startup Procedure 3 for a Double Layer Rewritable Optical Disc

Figure 11:
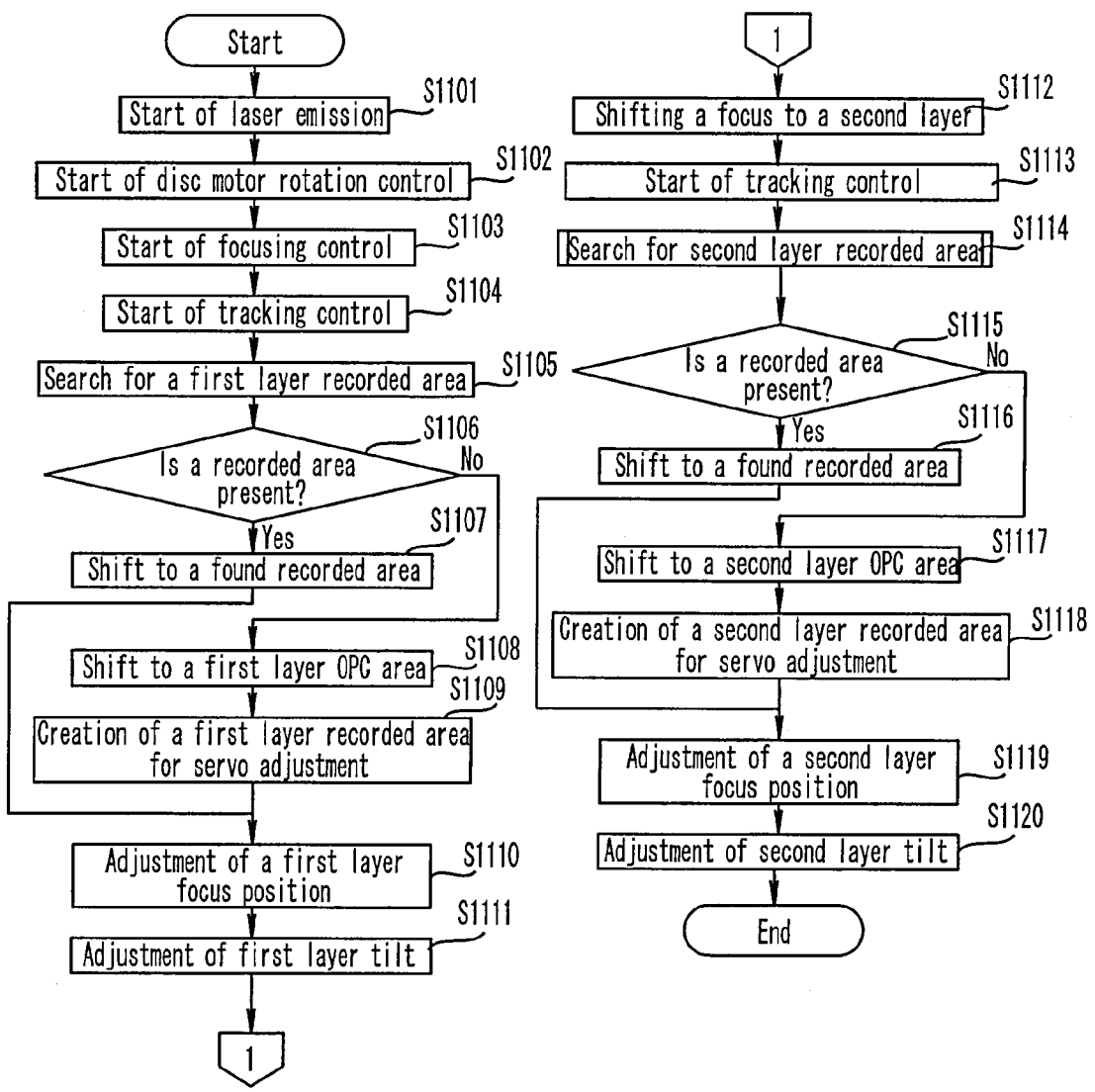
FIG. 11 is a flowchart showing a startup procedure, in which the recording/reproduction apparatus of FIG. 2 starts up the double layer rewritable optical disc of FIG. 10.

FIG. 11 shows a startup procedure 3, in which the recording/reproduction apparatus 500 starts up the double layer rewritable optical disc 1000.

Hereinafter, the startup procedure 3 according to Embodiment 3 of the present invention will be described step by step with reference to FIGS. 2, 10 and 11. The startup procedure 3 of Embodiment 3 of the present invention is performed by, for example, the CPU 514.

A distance from the optical head apparatus 540 to the first recording layer 1010 is different from a distance from the optical head apparatus 540 to the second recording layer 1020, or a distance from the optical head apparatus 540 to a medium of the first recording layer 1010 is different from a distance from the optical head apparatus 540 to a medium of the second recording layer 1020. For example, in order to access one recording layer positioned farther from an optical head apparatus, it is necessary to pass through the other recording layer closer to the optical head apparatus. Therefore, the two layers have different servo characteristics. As a result, the first recording layer and the second recording layer need to be separately subjected to reproduction adjustment.

Step S1101: if the CPU 514 detects when the double layer rewritable optical disc 1000 is mounted, the CPU 514 outputs the laser light emission enable signal 522, which permits the laser drive circuit 505 to emit laser light. The laser drive circuit 505 emits laser light with a predetermined reproduction power.

Step S1102: the CPU 514 instructs the servo circuit 509 to drive the disc motor 502. The servo circuit 509 controls the disc motor drive signal 521 to drive the disc motor 502 with a predetermined speed.

Step S1103: the CPU 514 instructs the servo circuit 509 to start focusing control. The servo circuit 509 controls the actuator 504 based on the actuator drive signal 525 to move the lens 503 upward and downward so that the focus of the laser is brought onto the first recording layer 1010. In this case, the servo circuit 509 generates focus error information based on the servo error signal 524 and performs feedback control to eliminate focus errors.

Step S1104: the CPU 514 instructs the servo circuit 509 to start tracking control. The servo circuit 509 controls the actuator 504 via the actuator drive signal 525 to move the lens 503 so that the focus of the laser follows a track on the first recording layer 1010. In this case, the servo circuit 509 generates tracking error information based on the servo error signal 524 and performs feedback control to eliminate tracking errors.

Step S1105: the CPU 514 controls the servo circuit 509 so that the optical head apparatus 540 is moved to a predetermined position on the first recording layer 1010, and performs a search for a recorded area. The details of this step are the same as that which has been described with reference to FIG. 4 and will not be explained.

Step S1106: in the first layer recorded area search step (step S1105), when it is determined that a recorded area is present (Yes), the procedure goes to step S1107. When it is determined that no recorded area is present (No), the procedure goes to step S1108.

Step S1107: the CPU 514 controls the servo circuit 509 to set a reproduction position to the recorded area found on the first recording layer 1010 in step S1106. The servo circuit 509 drives the transport support 507 and the actuator 504, as required, to change the reproduction position of a light spot.

Step S1108: the CPU 514 controls the servo circuit 509 to set a reproduction position on the first recording layer 1010 to the first layer OPC area 1013. The servo circuit 509 drives the transport support 507 and the actuator 504, as required, to change the reproduction position of a light spot.

Step S1109: the CPU 514 sets a recording pulse control parameter for the first recording layer, which is previously read out from the first layer PIC area 1011, to the laser drive circuit 505. The CPU 514 generates random data in the buffer 513. Thereafter, the CPU 514 controls the ECC circuit 512 and the modulation/demodulation circuit 511 to transmit data in the buffer 513 to the laser drive circuit 505. The laser drive circuit 505 controls and converts a laser power and a recording pulse width based on the received modulated data signal 533 and the recording pulse control parameter set by the CPU 514. Data is recorded onto the double layer rewritable optical disc 1000 by irradiating with the light. As described above, a recorded area for reproduction adjustment is created in the first layer OPC area 1013 of the first recording layer 1010.

Step S1110: the CPU 514 transmits an instruction for the servo circuit 509 to perform focus position adjustment. The servo circuit 509 controls the actuator 504 to change a focus position and also measures a jitter value based on the servo error signal 524 received from the preamplifier 508. The servo circuit 509 repeats the operation to search for a focus position which minimizes the jitter value and sets the focus position to an internal focus offset for the first recording layer 1010. In this case, when it is determined in step S1106 that a recorded area is present, the area for measurement of jitter is the recorded area found within the first recording layer 1010. When it is determined in step S1106 that no recorded area is present, the recorded area for reproduction adjustment created in the first layer OPC area 1013 in step S1109 is used.

Step S1111: the CPU 514 transmits an instruction for the servo circuit 509 to perform tilt adjustment. The servo circuit 509 changes a tilt state of the lens 503 by controlling the actuator 504, and also measures a jitter value based on the servo error signal 524 received from the preamplifier 508. The servo circuit 509 repeats the operation to search for a tilt setting which minimizes a jitter value and sets such a tilt setting for the first recording layer 1010 therewithin.

Step S1112: the CPU 514 instructs the servo circuit 509 to shift the focus position from the first recording layer 1010 to the second recording layer 1020. The servo circuit 509 controls the actuator 504 based on the actuator drive signal 525 to move the lens 503 upward and downward so that the focus of laser is brought onto the second recording layer 1020.

Step S1113: the CPU 514 instructs the servo circuit 509 to start tracking control. The servo circuit 509 controls the actuator 504 via the actuator drive signal 525 to move the lens 503 so that the focus of the laser follows a track on the second recording layer 1020. In this case, the servo circuit 509 generates tracking error information based on the servo error signal 524 and performs feedback control to eliminate tracking errors.

Step S1114: the CPU 514 controls the servo circuit 509 to shift the optical head apparatus 540 to a predetermined position on the second recording layer 1020, at which search for a recorded area is performed. The details of this step are the same as those which have been described with reference to FIG. 4 and will not be explained.

Step S1115: in the second layer recorded area search step (step S1114), when it is determined that a recorded area is present (Yes), the procedure goes to step S1116. When it is determined that no recorded area is present (No), the process goes to step S1117.

Step S1116: the CPU 514 controls the servo circuit 509 to set a reproduction position to the recorded area found on the second recording layer 1020 in step S1114. The servo circuit 509 drives the transport support 507 and the actuator 504, as required, to change the reproduction position of a light spot.

Step S1117: the CPU 514 controls the servo circuit 509 to set a reproduction position on the second recording layer 1020 to the second layer OPC area 1023. The servo circuit 509 drives the transport support 507 and the actuator 504, as required, to change the reproduction position of a light spot.

Step S1118: the CPU 514 sets a recording pulse control parameter for the second recording layer, which is previously read out from the second layer PIC area 1021, to the laser drive circuit 505. The CPU 514 generates random data in the buffer 513. Thereafter, the CPU 514 controls the ECC circuit 512 and the modulation/demodulation circuit 511 to transmit data in the buffer 513 to the laser drive circuit 505. The laser drive circuit 505 controls and converts a laser power and a recording pulse width based on the received modulated data signal 533 and the recording pulse control parameter set by the CPU 514. Data is recorded onto the double layer rewritable optical disc 1000 by irradiating with the light. As described above, a recorded area for reproduction adjustment is created in the second layer OPC area 1023 of the second recording layer 1020.

Step S1119: the CPU 514 transmits an instruction for the servo circuit 509 to perform focus position adjustment. The servo circuit 509 controls the actuator 504 to change a focus position and also measures a jitter value based on the servo error signal 524 received from the preamplifier 508. The servo circuit 509 repeats the operation to search for a focus position which minimizes the jitter value and sets the focus position to an internal focus offset for the second recording layer 1020. In this case, when it is determined in step S1115 that a recorded area is present, the area for measurement of jitter is the recorded area found within the second recording layer 1020. When it is determined in step S1115 that no recorded area is present, the recorded area for reproduction adjustment created in the second layer OPC area 1023 in step S1118 is used.

Step S1120: the CPU 514 transmits an instruction for the servo circuit 509 to perform tilt adjustment. The servo circuit 509 changes a tilt state of the lens 503 by controlling the actuator 504, and also measures a jitter value based on the servo error signal 524 received from the preamplifier 508. The servo circuit 509 repeats the operation to search for a tilt setting which minimizes a jitter value and sets such a tilt setting for the second recording layer 1020 therewithin.

Step S1105 and step S1106 provide a first layer recorded area search step of determining whether or not a recorded area is present in the first recording layer 1010. Step S1114 and step S1115 provide a second layer recorded area search step of determining whether or not a recorded area is present in the second recording layer 1020.

Step S1109 provides a first layer reproduction adjustment area creating step of creating a recorded area for adjusting a reproduction control parameter for a first recording layer when no recorded area is present in the first recording layer 1010. Step S1118 provides a second layer reproduction adjustment area creating step of creating a recorded area for adjusting a reproduction control parameter for a second recording layer when no recorded area is present in the second recording layer 1020.

In step S1109, a recorded area is created using a recording pulse control parameter stored in the first layer PIC area 1011. In step S1118, a recorded area is created using a recording pulse control parameter stored in the second layer PIC area 1021. However, the present invention is not limited to this.

Any recording pulse control parameter may be used which is appropriate for each recording layer. For example, when an information recording/reproduction apparatus stores results of adjustment of recording pulse control parameters, which has been previously performed, in a non-volatile memory, the adjustment results stored in the non-volatile memory may be used. Alternatively, a recording pulse control parameter may be adjusted and optimized while actually recording data into the first layer OPC area 1013 or the second layer OPC area 1023, and a result of the adjustment may be used.

Step S1110 and step S1111 provide a first layer reproduction adjustment step of adjusting a control parameter required for reproduction of a first recording layer. Step S1119 and step S1120 provide a second layer reproduction adjustment step of adjusting a control parameter required for reproduction of a second recording layer. Servo control parameters, such as a focus position and a tilt, have been described above. However, reproduction parameters are not limited to these. Other examples of servo control parameter adjustment may include adjustment of a beam expander for correcting spherical aberration, adjustment of an offset of a servo circuit, adjustment of an offset of stray light, and adjustment of a gain of a servo signal. For example, a slice level may be adjusted when an analog signal is converted to a digital (binary) signal, or an attenuator value may be adjusted to optimize an amplification rate of a reproduction signal. In other words, a signal processing system adjustment may be performed. For example, an offset of a laser circuit may be adjusted, or a gain of a laser-system control loop may be adjusted. In other words, laser system adjustment may be performed. Further, the number of reproduction parameters to be adjusted is not limited to two. One or more reproduction parameters may be adjusted.

In step S1110, step S1111, step S1119 and step S1120, a focus position and a tilt setting are searched for, which minimize a jitter value. Any method for adjusting an appropriate focus position and tilt setting may be used. For example, they may be adjusted to minimize an MLSE (Maximum Likelihood Sequence Error).

As described above, according to the startup procedure 3 of Embodiment 3 of the present invention, each of a plurality of recording layers is searched for a recorded area. Therefore, even when a plurality of recording layers have different characteristics, an appropriate reproduction adjustment process can be achieved.

When no recorded area is present in each of a plurality of recording layers, an area for reproduction adjustment is created using an OPC area (the first layer OPC area 1013 and the second layer OPC area 1023) in each of the recording layers. Therefore, reproduction adjustment can be optimally performed for each of a plurality of recording layers.

In Embodiment 3 of the present invention, the double layer rewritable optical disc 1000 has been described as an example. In the case of a double layer write-once optical disc in which a control data area is previously changed to a recorded area, the startup procedure 3 of Embodiment 3 of the present invention can be used, except that no DMA area is used.

4. Embodiment 4

4-1. Double Layer Write-once Optical Disc

Figure 12:
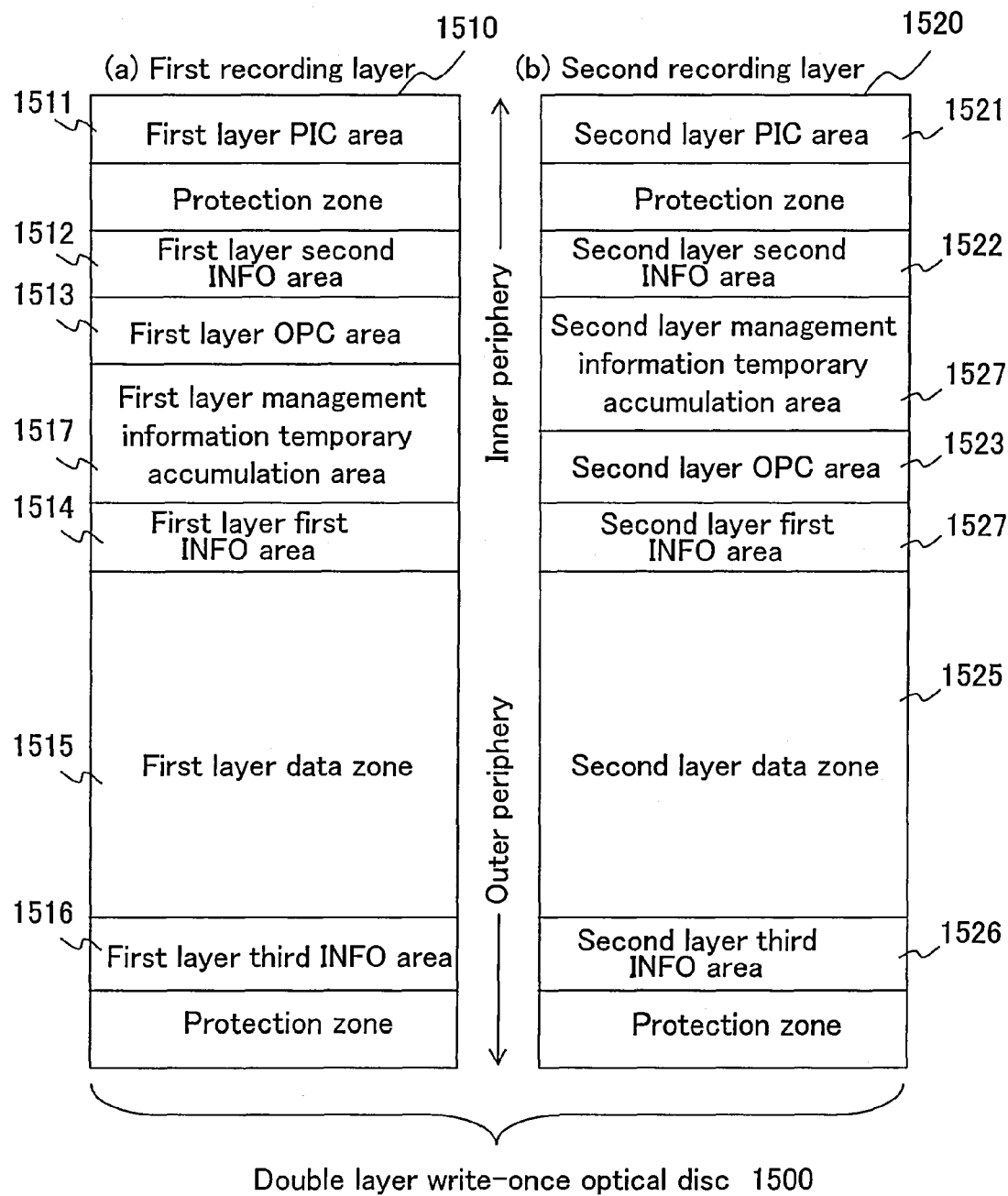
FIG. 12 is a diagram showing a data structure of a double layer write-once optical disc.

FIG. 12 shows a data structure of a double layer write-once optical disc 1500.

The double layer write-once optical disc 1500 comprises a first recording layer 1510 and a second recording layer 1520. The first recording layer 1510 has a data structure similar to that of the write-once optical disc 800 (see FIG. 8), and since their correspondence is clear, will not be explained. The second recording layer 1520 has a data structure similar to that of the write-once optical disc 800, and since their correspondence is clear, will not be explained.

Figure 13:
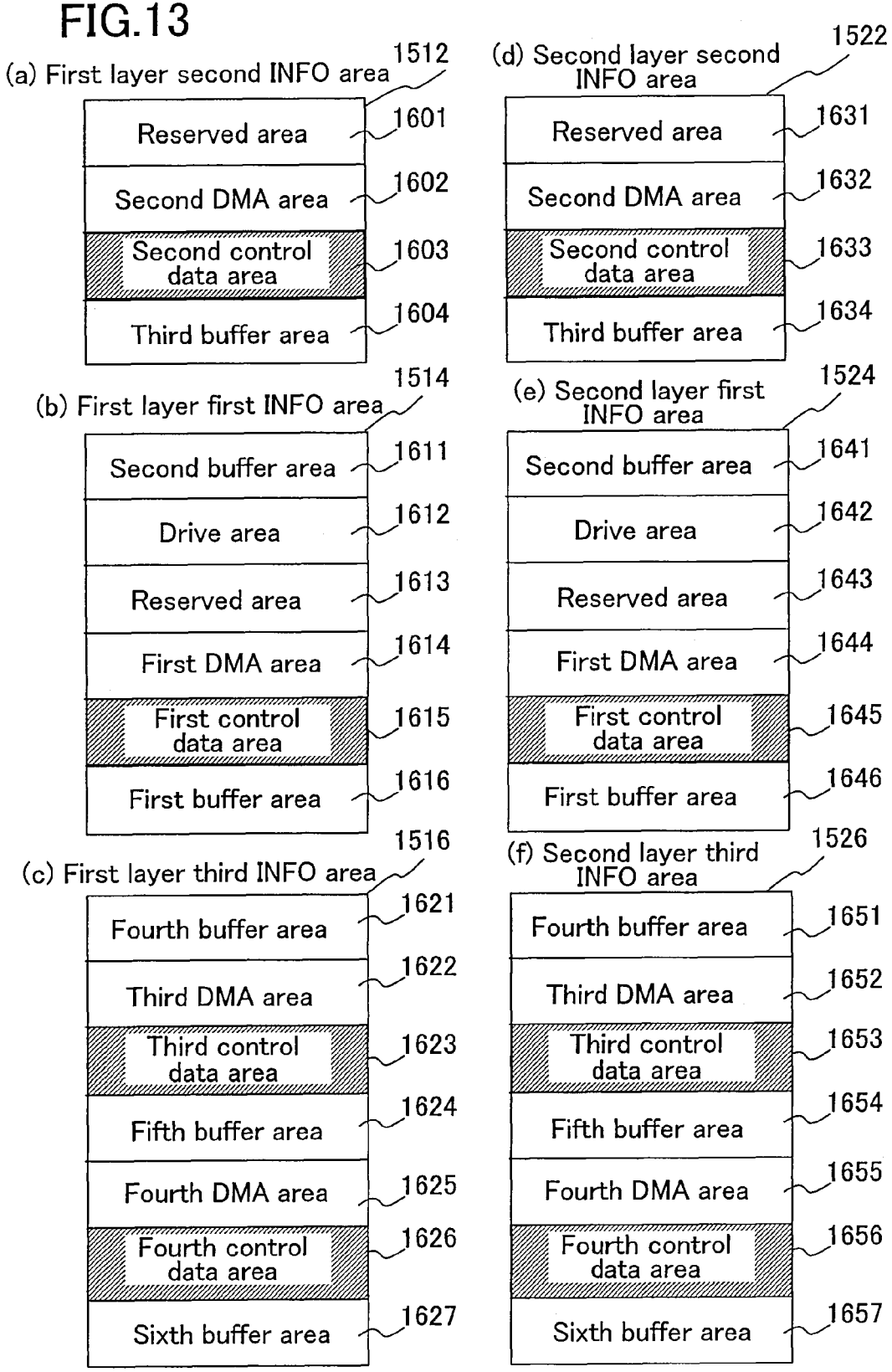
FIG. 13 is a diagram showing data structures of a plurality of INFO areas contained in the double layer write-once optical disc of FIG. 12.

FIG. 13 shows data structures of a plurality of INFO areas contained in the double layer write-once optical disc 1500.

The first recording layer 1510 contains a first layer second INFO area 1512, a first layer first INFO area 1514, and a first layer third INFO area 1516. The first recording layer 1510 has a data structure similar to that of the double layer rewritable optical disc 1000 (see FIG. 10), and since their correspondence is clear, will not be explained.

The second recording layer 1520 contains a second layer second INFO area 1522, a second layer first INFO area 1524, and a second layer third INFO area 1526. The second recording layer 1520 has a data structure similar to that of the double layer rewritable optical disc 1000 (see FIG. 10), and since their correspondence is clear, will not be explained.

4-2. Startup Procedure 4 for a Double Layer Write-once Optical Disc

Figure 14:
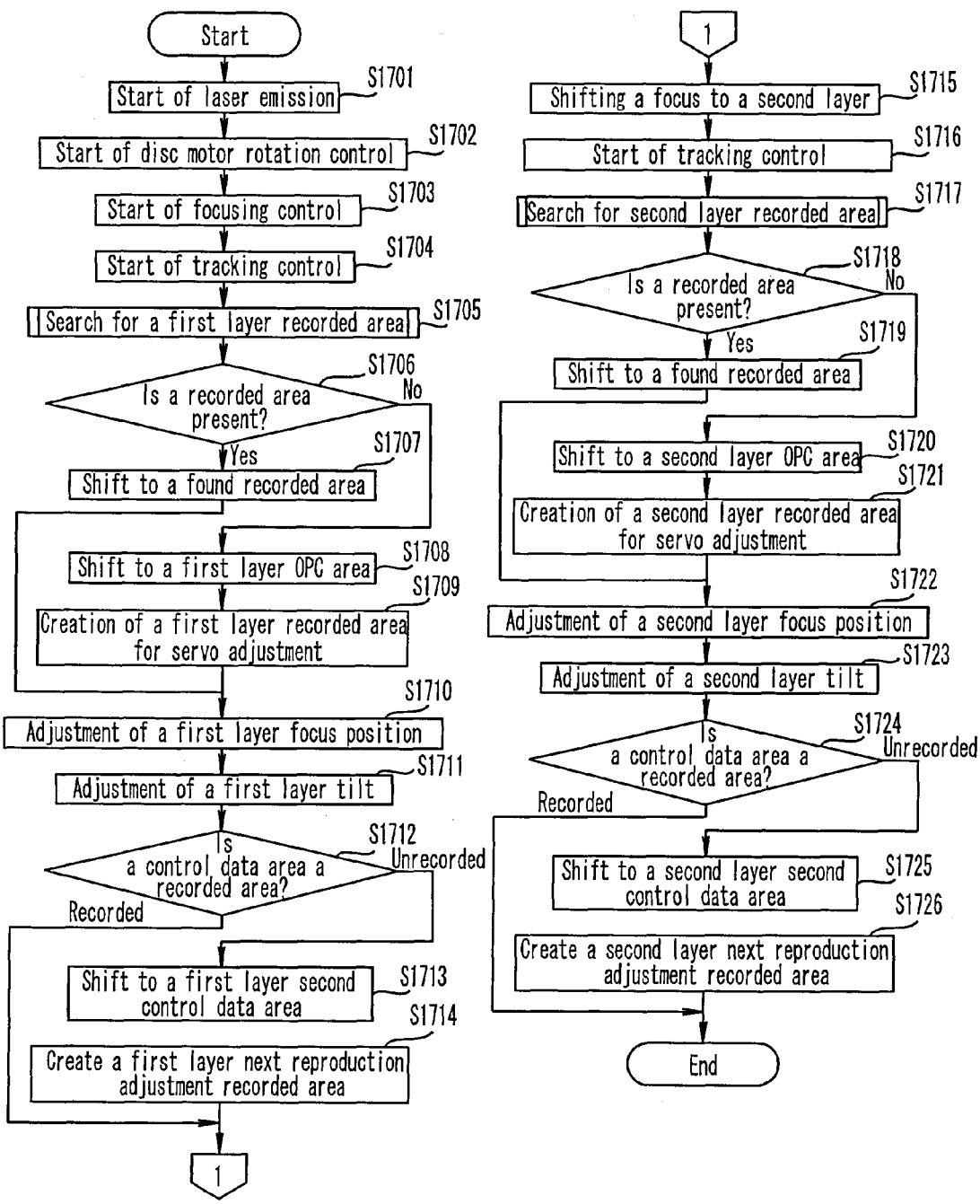
FIG. 14 is a flowchart showing a startup procedure, in which the recording/reproduction apparatus of FIG. 2 starts up the double layer write-once optical disc of FIG. 12.

FIG. 14 shows a startup procedure 4, in which the recording/reproduction apparatus 500 starts up the double layer write-once optical disc 1500.

Hereinafter, the startup procedure 4 according to Embodiment 4 of the present invention will be described step by step with reference to FIGS. 12 to 14. The startup procedure 4 of Embodiment 4 of the present invention is performed by, for example, the CPU 514.

A distance from the optical head apparatus 540 to the first recording layer 1510 is different from a distance from the optical head apparatus 540 to the second recording layer 1520, or a distance from the optical head apparatus 540 to a medium of the first recording layer 1510 is different from a distance from the optical head apparatus 540 to a medium of the second recording layer 1520. For example, in order to access one recording layer positioned farther from an optical head apparatus, it is necessary to pass through the other recording layer closer to the optical head apparatus. Therefore, the two layers have different servo characteristics. As a result, the first recording layer and the second recording layer need to be separately subjected to reproduction adjustment.

Step S1701: if the CPU 514 detects when the double layer write-once optical disc 1500 is mounted, the CPU 514 outputs the laser light emission enable signal 522, which permits the laser drive circuit 505 to emit laser light. The laser drive circuit 505 emits laser light with a predetermined reproduction power.

Step S1702: the CPU 514 instructs the servo circuit 509 to drive the disc motor 502. The servo circuit 509 controls the disc motor drive signal 521 to drive the disc motor 502 with a predetermined speed.

Step S1703: the CPU 514 instructs the servo circuit 509 to start focusing control. The servo circuit 509 controls the actuator 504 based on the actuator drive signal 525 to move the lens 503 upward and downward so that the focus of laser is brought onto the first recording layer 1510. In this case, the servo circuit 509 generates focus error information based on the servo error signal 524 and performs feedback control to eliminate focus error.

Step S1704: the CPU 514 instructs the servo circuit 509 to start tracking control. The servo circuit 509 controls the actuator 504 via the actuator drive signal 525 to move the lens 503 so that the focus of laser follows a track on the first recording layer 1510. In this case, the servo circuit 509 generates tracking error information based on the servo error signal 524 and performs feedback control to eliminate tracking error.

Step S1705: the CPU 514 controls the servo circuit 509 so that the optical head apparatus 540 is moved to a predetermined position on the first recording layer 1510, and performs a search for a recorded area. The details of this step are the same as that which has been described with reference to FIG. 12 and will not be explained.

Step S1706: in the first layer recorded area search step (step S1705), when it is determined that a recorded area is present (Yes), the procedure goes to step S7107. When it is determined that no recorded area is present (No), the process goes to step S1708.

Step S1707: the CPU 514 controls the servo circuit 509 to set a reproduction position to the recorded area found on the first recording layer 1510 in step S1706. The servo circuit 509 drives the transport support 507 and the actuator 504, as required, to change the reproduction position of a light spot.

Step S1708: the CPU 514 controls the servo circuit 509 to set a reproduction position on the first recording layer 1510 to the first layer OPC area 1513. The servo circuit 509 drives the transport support 507 and the actuator 504, as required, to change the reproduction position of a light spot.

Step S1709: the CPU 514 sets a recording pulse control parameter for the first recording layer, which is previously read out from the first layer PIC area 1511, to the laser drive circuit 505. The CPU 514 generates random data in the buffer 513. Thereafter, the CPU 514 controls the ECC circuit 512 and the modulation/demodulation circuit 511 to transmit data in the buffer 513 to the laser drive circuit 505. The laser drive circuit 505 controls and converts a laser power and a recording pulse width based on the received modulated data signal 533 and the recording pulse control parameter set by the CPU 514. Data is recorded onto the double layer write-once optical disc 1500 by irradiating it with the light. As described above, a recorded area for reproduction adjustment is created in the first layer OPC area 1513 of the first recording layer 1510.

Step S1710: the CPU 514 transmits an instruction for the servo circuit 509 to perform focus position adjustment. The servo circuit 509 controls the actuator 504 to change a focus position and also measures a jitter value based on the servo error signal 524 received from the preamplifier 508. The servo circuit 509 repeats the operation to search for a focus position which minimizes the jitter value and sets the focus position to an internal focus offset for the first recording layer 1510. In this case, when it is determined in step S1706 that a recorded area is present, the area for measurement of jitter is the recorded area found within the first recording layer 1510. When it is determined in step S1706 that no recorded area is present, the recorded area for reproduction adjustment created in the first layer OPC area 1513 in step S1709 is used.

Step S1711: the CPU 514 transmits an instruction for the servo circuit 509 to perform tilt adjustment. The servo circuit 509 changes a tilt state of the lens 503 by controlling the actuator 504, and also measures a jitter value based on the servo error signal 524 received from the preamplifier 508. The servo circuit 509 repeats the operation to search for a tilt setting which minimizes a jitter value and sets such a tilt setting for the first recording layer 1510 therewithin.

Step S1712: step S1706 is used to determine whether or not a first layer second control data area 1603 is a recorded area. When it is determined to be a recorded area, the procedure goes to step S1715. When it is determined to be an unrecorded area, the procedure goes to step S1713.

Step S1713: the CPU 514 controls the servo circuit 509 to set a reproduction position on the first recording layer 1510 to the first layer second control data area 1603. The servo circuit 509 drives the transport support 507 and the actuator 504, as required, to change the reproduction position of a light spot.

Step S1714: step S1708 and step S1709 are used to record control information or NULL data containing only 0 into the first layer second control data area 1603. Therefore, when starting up the next time, the first layer second control data area 1603 is used as a recorded area.

Step S1715: the CPU 514 instructs the servo circuit 509 to shift the focus position from the first recording layer 1510 to the second recording layer 1520. The servo circuit 509 controls the actuator 504 based on the actuator drive signal 525 to move the lens 503 upward and downward so that the focus of the laser is brought onto the second recording layer 1520.

Step S1716: the CPU 514 instructs the servo circuit 509 to start tracking control. The servo circuit 509 controls the actuator 504 via the actuator drive signal 525 to move the lens 503 so that the focus of the laser follows a track on the second recording layer 1520. In this case, the servo circuit 509 generates tracking error information based on the servo error signal 524 and performs feedback control to eliminate tracking errors.

Step S1717: the CPU 514 controls the servo circuit 509 to shift the optical head apparatus 540 to a predetermined position on the second recording layer 1520, at which search for a recorded area is performed. The details of this step are the same as that which has been described with reference to FIG. 12 and will not be explained.

Step S1718: in the second layer recorded area search step (step S1717), when it is determined that a recorded area is present (Yes), the procedure goes to step S1719. When it is determined that no recorded area is present (No), the process goes to step S1720.

Step S1719: the CPU 514 controls the servo circuit 509 to set a reproduction position to the recorded area found on the second recording layer 1520 in step S1717. The servo circuit 509 drives the transport support 507 and the actuator 504, as required, to change the reproduction position of a light spot.

Step S1720: the CPU 514 controls the servo circuit 509 to set a reproduction position on the second recording layer 1520 to the second layer OPC area 1523. The servo circuit 509 drives the transport support 507 and the actuator 504, as required, to change the reproduction position of a light spot.

Step S1721: the CPU 514 sets a recording pulse control parameter for the second recording layer, which is previously read out from the second layer PIC area 1521, to the laser drive circuit 505. The CPU 514 generates random data in the buffer 513. Thereafter, the CPU 514 controls the ECC circuit 512 and the modulation/demodulation circuit 511 to transmit data in the buffer 513 to the laser drive circuit 505. The laser drive circuit 505 controls and converts a laser power and a recording pulse width based on the received modulated data signal 533 and the recording pulse control parameter set by the CPU 514. Data is recorded onto the double layer write-once optical disc 1500 by irradiating it with the light. As described above, a recorded area for reproduction adjustment is created in the second layer OPC area 1523 of the second recording layer 1520.

Step S1722: the CPU 514 transmits an instruction for the servo circuit 509 to perform focus position adjustment. The servo circuit 509 controls the actuator 504 to change a focus position and also measures a jitter value based on the servo error signal 524 received from the preamplifier 508. The servo circuit 509 repeats the operation to search for a focus position which minimizes the jitter value and sets the focus position to an internal focus offset for the second recording layer 1520. In this case, when it is determined in step S1718 that a recorded area is present, the area for measurement of jitter is the recorded area found within the second recording layer 1520. When it is determined in step S1718 that no recorded area is present, the recorded area for reproduction adjustment created in the second layer OPC area 1523 in step S11721 is used.

Step S1723: the CPU 514 transmits an instruction for the servo circuit 509 to perform tilt adjustment. The servo circuit 509 changes a tilt state of the lens 503 by controlling the actuator 504, and also measures a jitter value based on the servo error signal 524 received from the preamplifier 508. The servo circuit 509 repeats the operation to search for a tilt setting which minimizes a jitter value and sets such a tilt setting for the second recording layer 1520 therewithin.

Step S1724: Step S1717 and step S1718 are used to determine whether or not a second layer second control data area 1633 is a recorded area. When it is determined to be a recorded area, the startup process is ended. When it is determined to be an unrecorded area, the procedure goes to step S1725.

Step S1725: the CPU 514 controls the servo circuit 509 to set a reproduction position on the second recording layer 1520 to the second layer second control data area 1623. The servo circuit 509 drives the transport support 507 and the actuator 504, as required, to change the reproduction position of a light spot.

Step S1726: step S1721 is used to record control information or NULL data containing only 0 into the second layer second control data area 1633. Therefore, when starting up the next time, the second layer second control data area 1623 is used as a recorded area. After recording of the second layer second control data area 1633 is ended, the startup process is ended.

As described with reference to FIG. 14, when the startup process has been performed by executing steps S1712 to S1714 or steps S1724 to S1726, at least one control data area (the first layer second control data area 1603 or the second layer second control data area 1633) is changed into at least one recorded area. Therefore, when an optical disc in which all user data areas are unrecorded areas is loaded, at least one area of the user data areas is changed into a recorded area after the startup process. In other words, when at least one user data area is a recorded area, at least one control data area is at least is at least one recorded area.

Step S1710 and step S1711 provide a first layer reproduction adjustment step of adjusting a control parameter required for reproduction of a first recording layer. Step S1722 and step S1723 provide a second layer reproduction adjustment step of adjusting a control parameter required for reproduction of a second recording layer. Servo control parameters, such as a focus position and a tilt, have been described above. However, reproduction parameters are not limited to these. Other examples of servo control parameter adjustment may include adjustment of a beam expander for correcting spherical aberration, adjustment of an offset of a servo circuit, adjustment of an offset of stray light, and adjustment of a gain of a servo signal. For example, a slice level may be adjusted when an analog signal is converted to a digital (binary) signal, or an attenuator value may be adjusted to optimize an amplification rate of a reproduction signal. In other words, a signal processing system adjustment may be performed. For example, an offset of a laser circuit may be adjusted, or a gain of a laser-system control loop may be adjusted. In other words, laser system adjustment may be performed. Further, the number of reproduction parameters to be adjusted is not limited to two. One or more reproduction parameters may be adjusted.

In step S1714 and step S1726, the first layer second control data area 1603 and the second layer second control data area 1633 are assumed to be recorded areas. However, an area to be a recorded area may be any area as long as it is located at a predetermined position. For example, such an area may be a buffer area, a DMA area, or a data area. The number of recorded areas is not limited to one. All control data areas, or all control data areas and all buffer areas, may be recorded areas. Alternatively, a portion of all areas may be recorded areas.

Step S1705 and step S1706 provide a first layer recorded area search step of determining whether or not a recorded area is present in the first recording layer 1510. Step S1717 and step S1718 provide a second layer recorded area search step of determining whether or not a recorded area is present in the second recording layer 1520.

In step S1712 and step S1724, the first layer recorded area search step and the second layer recorded area search step are used to determine whether or not the first layer second control data area 1603 and the second layer second control data area 1633 are recorded areas. Alternatively, the first layer recorded area search step and the second layer recorded area search step may be used to search the first layer second control data area 1603 and the second layer second control data area 1633, and based on the result, a determination may be performed.

Step S1709 provides a first layer reproduction adjustment area creating step of creating a recorded area for adjusting a reproduction control parameter for a first recording layer when no recorded area is present in the first recording layer 1510. Step S1721 provides a second layer reproduction adjustment area creating step of creating a recorded area for adjusting a reproduction control parameter for a second recording layer when no recorded area is present in the second recording layer 1520.

In step S1709, a recorded area is created using a recording pulse control parameter stored in the first layer PIC area 1511. In step S1721, a recorded area is created using a recording pulse control parameter stored in the second layer PIC area 1521. However, the present invention is not limited to this. Any recording pulse control parameter may be used which is appropriate for each recording layer. For example, when an information recording/reproduction apparatus stores results of adjustment of recording pulse control parameters, which has been previously performed, in a non-volatile memory, the adjustment results stored in the non-volatile memory may be used. Alternatively, a recording pulse control parameter may be adjusted and optimized while actually recording data into a first layer OPC area 1513 or the second layer OPC area 1523, and a result of the adjustment may be used.

In step S1714, step S1709 is used to record data. In step S1726, step S1721 is used to record data. A recording pulse control parameter used in these steps may be obtained by the same method. For example, a recording pulse control parameter obtained from a PIC area may be used in step S1709 and step S1721. In step S1714 and step S1726, a recording pulse control parameter may be adjusted and optimized while actually recording data into an OPC area corresponding to each recording layer.

In step S1710, step S1711, step S1722 and step S1723, a focus position and a tilt setting are searched for, which minimize a jitter value. Any method for adjusting an appropriate focus position and tilt setting may be used. For example, they may be adjusted to minimize an MLSE (Maximum Likelihood Sequence Error).

In Embodiment 4 of the present invention, an area which is used as a recorded area in the next startup is created after a reproduction control parameter is adjusted. If an optimum recording pulse control parameter is used, such an area may be created after it is determined that an area is an unrecorded area. For example, the area may be created after creation of an OPC area. For example, the area may be created before creation of an OPC area. For example, the area may be created in each layer after adjusting a reproduction control parameter for each layer. For example, the area may be created in an idle state, i.e., when neither recording nor reproduction is performed for a predetermined time. For example, the area may be created before ejecting a disc. For example, the area may be created when an instruction to stop a startup process is received.

In Embodiment 4 of the present invention, a reproduction control parameter is adjusted in an OPC area or a recorded area found. Alternatively, the adjustment may be performed in an area which has been created for use in the next startup process.

As described above, according to the startup procedure 4 of Embodiment 4 of the present invention, each of a plurality of recording layers is searched for a recorded area. Therefore, even when a plurality of recording layers have different characteristics, an appropriate reproduction adjustment process can be achieved.

When no recorded area is present in each of a plurality of recording layers, an area for reproduction adjustment is created using an OPC area (the first layer OPC area 1513 and the second layer OPC area 1523) in each of the recording layers. Therefore, reproduction adjustment can be optimally performed for each of a plurality of recording layers.

As described above, according to the startup procedure 4 of Embodiment 4 of the present invention, when no recorded area is present in each recording layer, a recorded area which can be used in the next startup process can be created by causing a second control data area to be the recorded area. Therefore, reproduction adjustment can be performed without newly performing a reproduction adjustment area creating process. As a result, high-speed reproduction adjustment can be achieved. For a write-once optical disc which is not rewritable, a limited OPC area can be effectively used since no new reproduction adjustment area creating process is performed.

In Embodiment 4 of the present invention, the double layer write-once optical disc 1500 has been described as an example. It will be clearly understood that the present invention can be applied to a double layer rewritable optical disc containing an OPC area and a control data area. Therefore, the recorded area search step can be used both for a rewritable optical disc and a write-once optical disc, so that the present invention can be easily implemented into apparatuses.

A DMA area, a control data area, an OPC area, a management information temporary accumulation area, a buffer area, a reserved area, a protection zone, and a PIC area may be provided in a predetermined format, which is not limited to the data formats shown in FIGS. 1, 8, 10, 12 and 13. Such variations may be made without departing from the spirit and scope of the present invention. Variations obvious to those skilled in the art are included within the scope of the present invention. It will also be clearly understood that a buffer area, a reserved area and a protection zone may not be used without departing from the spirit and scope of the present invention.

5. Embodiment 5

Figure 15:
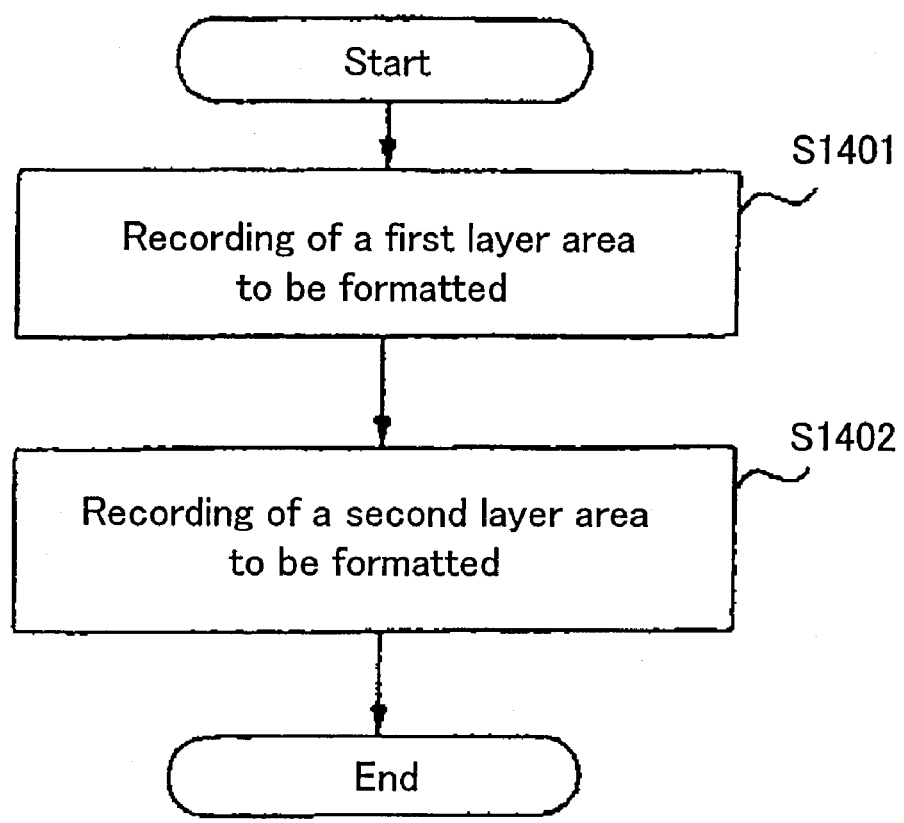
FIG. 15 is a flowchart showing a physical formatting procedure for a double layer optical disc.
Figure 16:
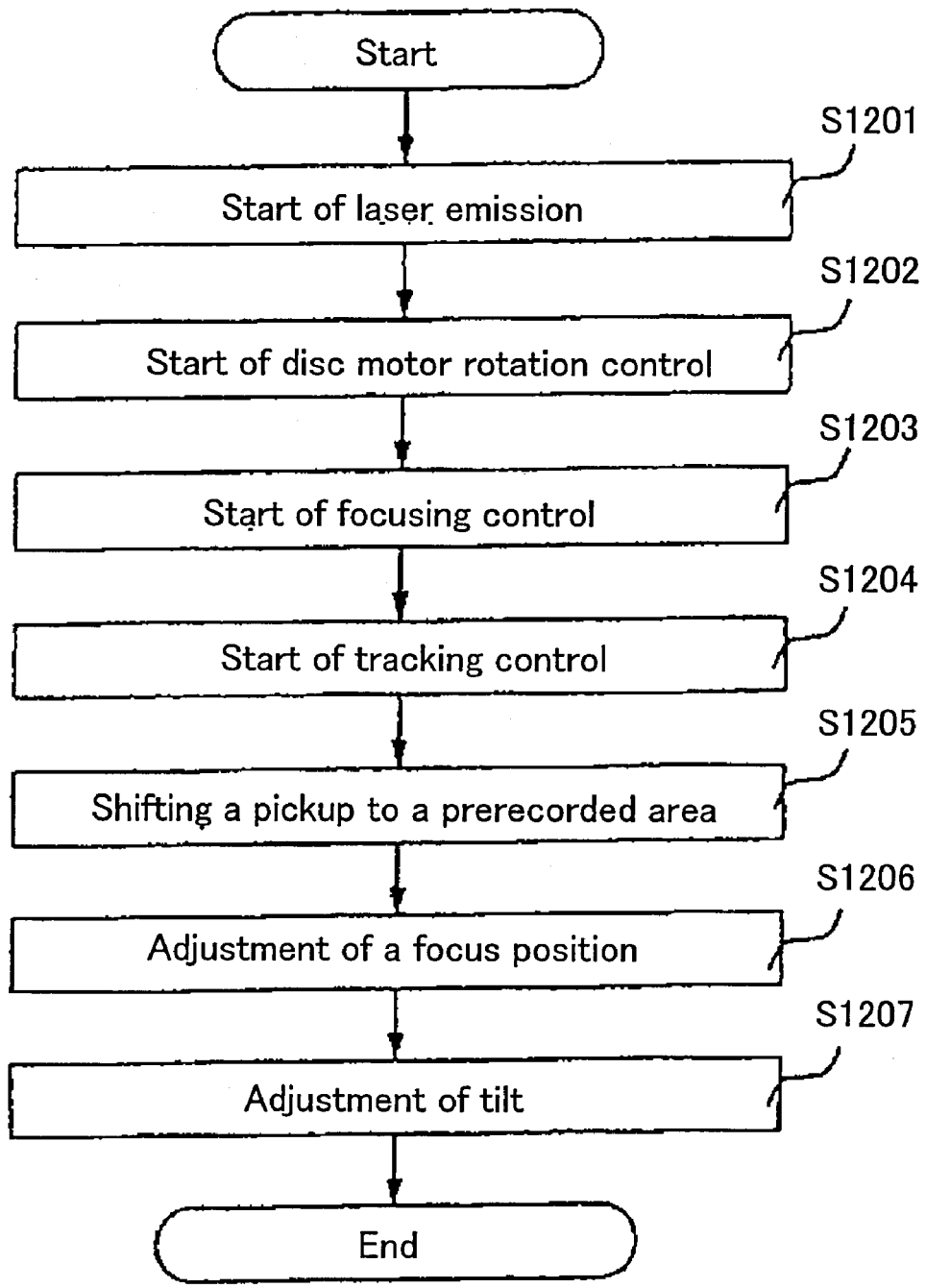
FIG. 16 is a flowchart showing an exemplary startup procedure for a conventional apparatus.
Figure 17:
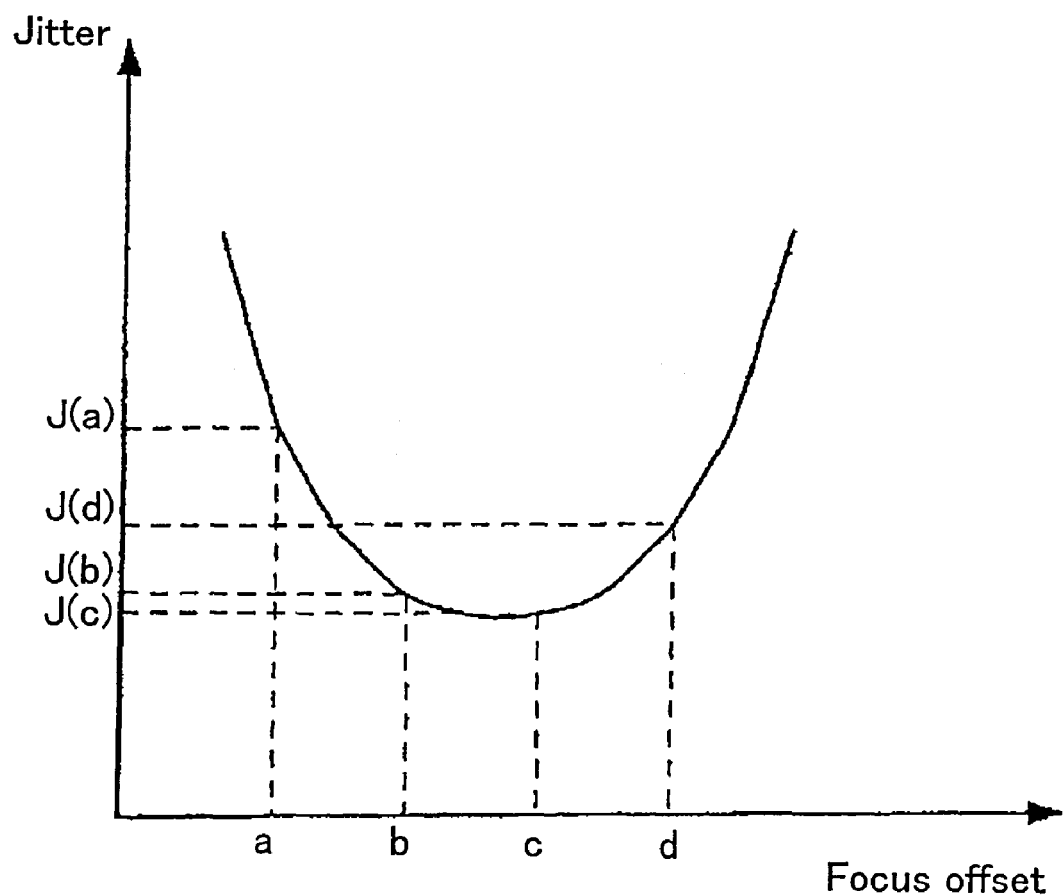
FIG. 17 is a diagram for explaining an exemplary focus position adjusting method.

FIG. 15 shows a physical formatting procedure for a double layer optical disc.

Hereinafter, the physical formatting procedure for a double layer optical disc will be described step by step with reference to FIGS. 11 and 15. The physical formatting procedure is performed by the CPU 514.

Step S1401: when physical formatting is requested from the user, recording is performed in a first layer area to be formatted (hereinafter referred to as a first layer formatting area). In this case, the first layer recorded area search step (step S1105, step S1106) is used to determine whether or not the first layer formatting area is a recorded area, and the recorded area creating step for first layer reproduction adjustment (step S1109) is used to perform recording.

Step S1402: after recording of the first layer formatting area is ended, recording is performed in a second layer area to be formatted (hereinafter referred to as a second layer formatting area). Similar to step S1401, a recorded area is searched for by the second layer recorded area search step (step S1114, step S1115), and recording is performed by the recorded area creating step for second layer reproduction adjustment (step S1118).

When a double layer optical disc is the double layer rewritable optical disc 1000, an area to be formatted may contain at least one of a first DMA area to a fourth DMA area and a first control data area to a fourth control data area contained in a first layer first INFO area to a first layer third INFO area (the area 1014, the area 1012, the area 1016), and at least one of a first DMA area to a fourth DMA area and a first control data area to a fourth control data area contained in a second layer first INFO area to a second layer third INFO area (the area 1024, the area 1022, the area 1026) (see FIG. 10).

When a double layer optical disc is the double layer write-once optical disc 1500, an area to be formatted may contain at least one of the first layer management information temporary accumulation area 1517 and a first control data area to a fourth control data area contained in a first layer first INFO area to a first layer third INFO area (the area 1514, the area 1512, the area 1516), and at least one of the second layer management information temporary accumulation area 1527 and a first control data area to a fourth control data area contained in a second layer first INFO area to a second layer third INFO area (the area 1524, the area 1522, the area 1526) (FIG. 13).

Note that recording may be performed in a portion, but not the whole, of an area to be subjected to recording.

In Embodiment 5 of the present invention, a double layer optical disc has been described. It will be clearly understood that Embodiment 5 of the present invention can be applied to the single layer rewritable optical disc 100 and the single layer write-once optical disc 800.

In Embodiment 5 of the present invention, recording of a first layer formatting area is ended before recording of a second layer format area is performed. The order of the recording processes is not limited to this. For example, recording is performed in a DMA area or a control data area provided in a first INFO area and a second INFO area in an inner peripheral portion of recording layers in order of a first layer and a second layer, and then in a DMA area or a control data area provided in a third INFO area in an outer peripheral portion of recording layers in order of the second layer and the first layer.

As described above, in the physical formatting procedure of Embodiment 5 of the present invention, a recorded area which can be used in the next startup process can be created in both a rewritable optical disc and a write-once optical disc.

Thus, Embodiments 1 to 5 of the present invention have been described with reference to FIGS. 1 to 15.

Each of the means and procedures described in Embodiments 1 to 5 of the present invention may be implemented as either hardware or software, or in combination thereof.

For example, the recording/reproduction apparatus 500 of the present invention may store a program for performing the functions of the recording/reproduction apparatus 500. Such a program executes the startup procedures 1 to 4, the recorded area search procedures 1 and 2, the recorded-state determination procedures 1 to 3, and the physical formatting procedure.

The program may be previously stored in a storage means provided in the recording/reproduction apparatus 500 when a computer is shipped. Alternatively, after a computer is shipped, the program may be stored into the storage means. For example, the program may be downloaded by the user from a particular web site on the Internet with or without payment, and the downloaded program may be installed into a computer. When the program is recorded in a computer readable recording medium, such as a flexible disc, a CD-ROM, a DVD-ROM, or the like, an input apparatus (e.g., a disc drive apparatus) may be used to install the program into a computer. The installed program is stored in the storage means.

The present invention can be used in a control apparatus and a method which controls an access means for accessing a recording medium containing at least one area so that the access means access the area; an access apparatus comprising a control means which controls an access means for accessing a recording medium containing at least one area so that the access means accesses the area; an access method; a program; and a write-once recording medium containing a plurality of areas.

According to the present invention, it is determined whether or not a recorded area is recorded in a recording medium. When it is determined that a recorded area is included, an access means is controlled based on a result of accessing the recorded area. Thus, in the present invention, when a recorded area is already included in a recording medium, an access means is controlled based on the result of accessing the recorded area without recording new data onto the recording medium. Therefore, a recording medium can be started up with high speed.

Although certain preferred embodiments have been described herein, it is not intended that such embodiments be construed as limitations on the scope of the invention except as set forth in the appended claims. Various other modifications and equivalents will be apparent to and can be readily made by those skilled in the art, after reading the description herein, without departing from the scope and spirit of this invention. All patents, published patent applications and publications cited herein are incorporated by reference as if set forth fully herein.

What is claimed is:

1. A recording apparatus for recording onto a write once information recording medium having a plurality of recording layers,
the recording apparatus comprising a light head device for irradiating a laser from one of a plurality of surfaces of the write-once information recording medium onto the once-write information recording medium, and
wherein the information recording medium, in each of a plurality of the recording layers, includes a user data area for storing user data, an adjusting area used to adjust control parameters, and a test area used to adjust a recording laser power,
wherein the adjusting area and the test area, in each of the plurality of the recording layers, are located at different positions,
the recording layer which is located closest to the light head device among the plurality of recording layers passes through the laser, and
a distance between the recording layer located closest to the light head device and the surface of the write-once information recording medium, and a distance between a recording layer other than the recording layer located closest to the light device and the surface of the write-once information recording medium, are different distances,
wherein, prior to using the information recording medium, in each of the plurality of the recording layers, data is recorded within the entire area of the adjusting area, in the user data area the user data is recorded by forming a mark along a track, and in the adjusting area data is recorded by forming the mark along the track in the same manner of recording as in the user data area.

2. The recording apparatus according to claim 1, wherein the recording apparatus records data of 0 into the entire adjusting area.

3. An information recording medium recorded by the recording apparatus according to claim 1, wherein the entire area within the adjusting area which is included in each of the plurality of the recording layers is already recorded.

4. The information recording medium according to claim 3, wherein the information recording medium is a write-once recording medium.

5. A reproduction apparatus for reproducing from the information recording medium which has been recorded by the recording apparatus according to claim 1, wherein prior to using the information recording medium in the adjusting area which is already recorded, the control parameter is adjusted and the reproduction of information from the user data area is performed.

* * * * *